United States Patent

[11] 3,628,642

[72] Inventor Raymond A. Ravenel
 Sceaux, France
[21] Appl. No. 888,764
[22] Filed Dec. 29, 1969
[45] Patented Dec. 21, 1971
[73] Assignee Societe Anonyme Automobiles Citroen
 Paris, France
[32] Priority Dec. 31, 1968
[33] France
[31] 182,909

[54] ELECTRONIC CONTROL DEVICE FOR
 TRANSMISSION MECHANISM
 21 Claims, 19 Drawing Figs.
[52] U.S. Cl. .................................................. 192/.073,
 74/752 D, 74/866, 192/3.56, 192/3.58, 317/148.5,
 192/4 A, 74/850
[51] Int. Cl. ........................................................ B60k 21/00
[50] Field of Search ............................................ 74/752 D,
 752 A, 866, 365; 192/3.56, 3.58, .073, .092

[56] References Cited
 UNITED STATES PATENTS
 3,122,940 3/1964 Shimwell ..................... 74/866
 3,267,762 8/1966 Reval ............................ 74/866 X
 3,354,744 11/1967 Kuhnle et al. ................. 192/3.56 X
 3,433,101 3/1969 Scholl et al. .................. 74/866
 3,439,564 4/1969 Scholl et al. .................. 74/752 A X
 3,448,640 6/1969 Nelson .......................... 74/752 A X Primary Examiner—Benjamin W. Wyche
Attorneys—Robert E. Burns and Emmanuel J. Lobato ABSTRACT: An automatic device for controlling a stepped-gear transmission mechanism of an automotive vehicle comprising a group of $n-1$ circuits in parallel for changing up to a higher gear and a group of $n-1$ circuits in parallel for changing down to a lower gear ($n$ being the number of forward speeds provided by the transmission mechanism or gearbox), these various circuits comprising level detector stages of which the switching thresholds are arranged in stepped relation to each other as a function of the various gear changes, and a generator of manual control pulses, responsive to a selector, for transmitting to the output stages manual-control pulses in parallel with the automatic-control pulses delivered by the various circuits for changing from a lower gear to an upper gear and vice versa. The gear shifting circuits are controlled by means responsive to accelerator position and a vehicle-driven tachometer, and may also be controlled by brake pedal operation to cause a shift down during vehicle braking. Means controlled by the ignition key cause the transmission to shift to neutral during starting.

ELECTRONIC CONTROL DEVICE FOR TRANSMISSION MECHANISM

BACKGROUND OF THE INVENTION

The present invention relates to an electronic device for controlling a stepped-gear transmission mechanism.

Devices for automatically controlling stepped-gear change speed or transmission mechanisms are already known which comprise generally a selector actuated by the driver or the vehicle and adapted to permit the manual or automatic operation, a generator delivering a control output voltage proportional to the vehicle speed and to the engine torque, and a series of relays or level detectors to which the aforesaid control voltage is applied and which become operative when predetermined voltage thresholds are overstepped for producing the gear change required by changing driving or road conditions, or according to the specific way of driving desired by the driver of the vehicle.

Hitherto known devices of this character are attended by various inconveniences, inter alia their considerably complexity and their high cost. On the other hand, in these devices when the selector is in the "automatic" control position, the driver cannot actuate this selector manually for changing the gear ratio at will, up or down, in superposition to the automatic operation.

SUMMARY OF THE INVENTION

It is the essential object of the present invention to avoid these various inconveniences by providing a particularly simple gear change control device providing a fully automatic control while permitting a manual intervention or change at any time.

To this end, the automatic device for controlling a stepped-gear transmission mechanism of an automotive vehicle, which comprises a driver-responsive manual pulse selector, a generator producing a general control voltage proportional to the vehicle speed and to the engine torque, an apparatus for automatically treating the information signals which receives said general control voltage at its input and comprises level-detecting stages adapted to switch or tilt from a first condition to a second condition when the control voltage reaches a threshold whereat the gear change is to take place, said stages being also adapted, when said gear changes take place, to transmit pulses transformed in corresponding output stages into signals of calibrated duration which are subsequently fed to electrical relays of servo means for controlling the transmission mechanism, the clutch and the engine throttle valve, which perform the sequence of usual operations associated with a gear change, is characterized in that the apparatus for automatically treating the input information signals comprise a group of $n-1$ circuits in parallel for changing up to a higher gear and a group of $n-1$ circuits in parallel for changing down to a lower gear ($n$ being the number of forward speeds provided by the transmission mechanism or gearbox), these various circuits comprising level detector stages of which the switching thresholds are arranged in stepped relation to each other as a function of the various gear changes, and that a generator of manual control pulses, responsive to said selector, is provided for transmitting to the output stages manual-control pulses in parallel with the automatic-control pulses delivered by the various circuits for changing from a lower gear to an upper gear, and vice versa.

The device according to this invention is adaptable to any vehicle, that is, both to a vehicle comprising only a conventional clutch and mechanical gearbox system and to a vehicle already equipped with automatic and semiautomatic clutch engaging and disengaging devices.

The control device according to this invention is advantageous in that it is particularly economical due to the systematic use of low-cost transistors or integrated circuits.

It is further advantageous in that it permits, either at the driver's will and/or as a function of road difficulties or conditions, to obtain either a manually controlled operation by means of electric pulses for producing the desired gear changes, or a fully automatic operation during which the driver may still change at will, as in a purely manual operation, the transmission ratio determined by the automatic operation.

In either mode of operation, changing down to a lower gear can take place with due consideration for the vehicle speed, provided that it does not imply a rotational speed inadequate or hazardous for the engine.

On the other hand, the operation of the control device according to this invention is rendered particularly reliable due to the provision of safety circuits adapted notably:

a. to protect the engine by preventing any accidental overstepping of the maximum rated speed, b. to automatically ascertain whether the orders issued are actually executed (in case of refusal by the mechanical unit adequate circuits will cause the necessary orders to be restored in phase even without the driver knowing it), c. to ensure a positive protection of the driving safety in case of failure of the pickup means giving the input information.

These last circuits are also capable of preserving the vehicle's safety in case the driving wheels became locked on icy roads, or for any other reason.

The hand lever of the control selector can be moved from automatic position to the manual position or vice versa at any time, whether the vehicle is being driven or is still, and it permits notably, by restoring said hand lever to the manual position, to keep the gear ratio displayed under automatic operation conditions at the time of the hand lever actuation for meeting particular driving requirements or conditions, such as driving downhill while using the engine's braking effect. Besides, the gear ratio engaged at any time is displayed numerically by an indicator on the instrument panel of the vehicle.

The control simplicity of the device and the search for a satisfactory choice in its general arrangement are such that the driver's actions thereon take place in a natural order so that the driver becomes rapidly familiarized with the device.

With this device the driver has free agency regarding indifferently automatic gear selection and change, automatic-cum-manual gear change, or manual gear change with servo action, so that any desired driving style can be maintained.

Finally, even when the hand lever of the gear selector is in the manual position, the electric pulses delivered by this selector are calibrated through a suitable electronic circuit and control the cycles of operations (clutch disengagement, gear change, correction of throttle position, clutch reengagement) that are themselves calibrated, and therefore once these maneuvers are properly determined they take place in the optimum fashion (from the point of view of jerks in the gear change speed etc.) independently of the driver's skill.

BRIEF DESCRIPTION OF THE DRAWING

A typical form of embodiment of the present invention will now be described by way of example with reference to the attached drawing, in which.

DESCRIPTION OF THE PREFERRED EMBODIMENTS.

Figure 1:
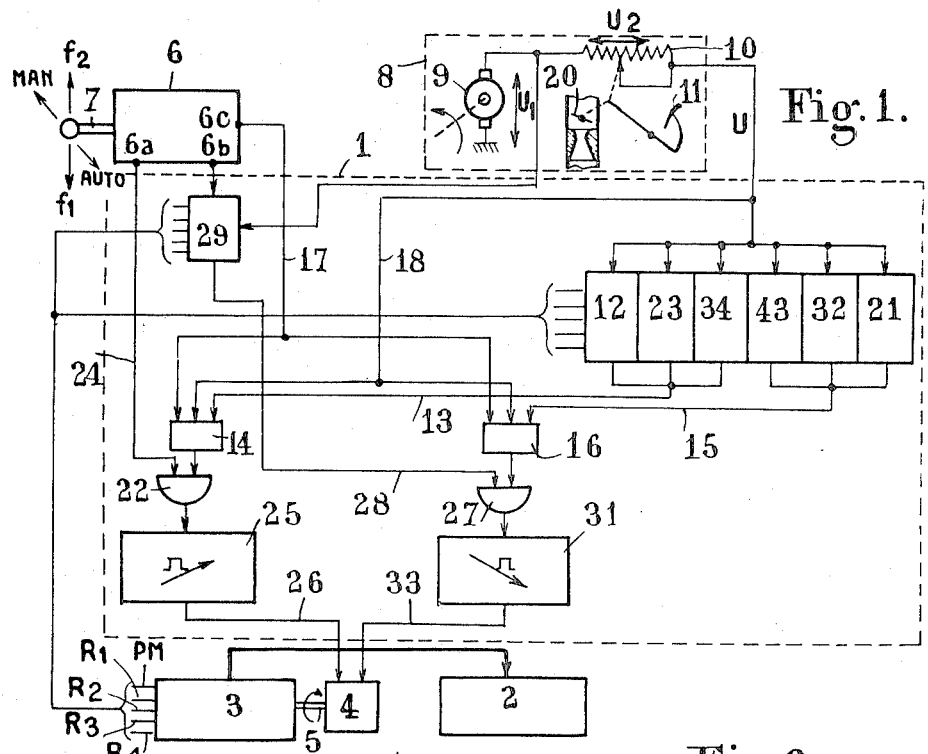
FIG. 1 is a block diagram showing the electronic device for controlling a stepped-gear transmission mechanism.

Referring first to the diagrammatic FIG. 1, the control device according to this invention comprises a circuit for treating input information signals and delivering output signals, this circuit being denoted generally by the reference numeral 1 and intended for the automatic and/or manual control of a change speed or transmission mechanism 2. This transmission mechanism 2 may be of any known type, for example of the sliding hub ro planet gear type, with mechanical, hydraulic, electromechanical or other known control means. The gear ratio to be obtained through the transmission mechanism 2 is selected by means of a servoaction device 3 controlling the transmission mechanism 2 through mechanical, hydraulic or electrical means (not shown). This servo action device is responsive in turn to a member 4 of the electric pulse control type which causes the rotation and/or translation of a control member 5 (for example a distributor) of the aforesaid servo action device 3. The gear ratio or speed obtained in the transmission mechanism 2 is displayed electrically through one of the five lines PM, R1, R2, R3 and R4 connected to the servo action device 3 or, in a modified arrangement, directly to the transmission mechanism 2. The grounding of line PM shows that the transmission mechanism 2 is in its neutral position, and similarly grounding any line R1, R2, R3 or R4 will show that the first, second, third or fourth (top) gear is engaged. These lines are also connected to the illuminated gearbox position indicator or display dial or like means carried by the instrument panel of the vehicle, as will be explained presently.

The circuit 1 also controls the clutch and the engaging throttle of the vehicle for producing the complete sequence of operations necessary for automatically changing from one gear to another.

This circuit 1 is connected on the other hand to a selector 6 adapted to be manually operated by the driver of the vehicle. This selector 6 comprises a single hand lever or key 7 adapted to pivot about two perpendicular axes. This hand lever 7 is adapted to be pushed (or pulled) by the driver when positioned, in its maximum stroke condition, in a manual control position "MAN" and on the contrary pulled (or pushed), in an opposite position corresponding to the automatic operation denoted "AUTO." On the other hand, the hand lever 7 can be moved in a direction at right angles to the preceding one, i.e., upwards or downwards, both in the MAN control position and in the AUTO control position. Thus, lowering the hand lever 7 in the direction of the arrow $f_1$ will cause the selector 6 to transmit a pulse for controlling the change to an upper gear, that is, to a higher speed, and lifting this hand lever 7 in the direction of the arrow $f_2$ will cause a change to a lower gear or speed. Of course, these movements may be reversed, if desired.

The selector and manual pulse generator 6 has three output terminals 6a, 6b and 6c connected to the circuit in a manner to be described presently.

Besides, this circuit 1 is also connected to a generator 8 of general control voltage U which comprises essentially a tachometric generator 9 rotatably driven at a speed proportional to the vehicle speed and connected in series with a variable resistance element 10, for example of the potentiometer type. The tachometric generator 9 may consist of a dynamo or like generator, or of an alternator-rectifier assembly delivering a voltage $U_1$ proportional to the vehicle speed. On the other hand, the potentiometer 10 or other similar variable-resistance element is operatively connected to the accelerator pedal 11 whereby the value of its resistance be subordinate to the position of the accelerator pedal 11 and therefore to the degree of opening of the engine throttle 20, and consequently to the engine torque. The variation in the valve of the electric resistance of potentiometer 10 as a function of the position of the accelerator pedal 11 may follow a linear law or any other law adapted to the specific vehicle to be equipped with the device of this invention. The potentiometer 10 will thus produce a voltage drop $U_2$ depending on the position of the accelerator pedal 10, i.e., on the torque demanded by the driver. Thus the generator 8 will deliver at its output terminal a control voltage $U=U_1-U_2$ depending on the vehicle speed and also on the engine torque demanded by the driver. This voltage may be used at the same time as a variable for controlling any apparatus depending on the engine torque such as the ignition timing device or a fuel feed device.

As will be seen presently the circuit 1 is constantly "aware" or informed of the particular gear ratio engaged in the transmission mechanism 2 and also, through the above-defined voltage U, of the demanded engine torque or power output.

The control voltage U is fed within the circuit 1 to six parallel-connected circuits, in the case of a four-speed transmission mechanism, namely circuits 12, 23 and 34 for changing to a higher speed, these last-named circuits delivering the orders necessary for changing from first or low gear to second gear, from second gear to third gear, from third gear to fourth or top gear, respectively, and three circuits 43, 32 and 21 for changing to a lower gear, which deliver the orders necessary for changing from top or fourth gear to third gear, from third gear to second gear and from second gear to first or low gear. These six circuits for changing up and down are also connected to the five lines PM, R1, R2, R3 and R4 for safety reasons as will be explained presently.

The outputs of the three up-change circuits 12, 23 and 34 are jointly connected via a conductor 13 to one input of a three-input AND-gate 14. Similarly, the outputs of the three change-down circuits 43, 32 and 21 are jointly connected via another conductor 15 to one input of a three-input AND-gate 16. A second input of this last-named AND-gate 16 and a second input of AND-gate 14 are jointly connected via a conductor 17 to the output terminal 6c of the manual pulse selector and generator 6. Finally, the third input of AND gate 16 and the third input of AND gate 14 are jointly connected via another conductor 18 to the output of generator 8 delivering the above-defined voltage U.

The output of AND-gate 14 is connected to one input of a two-input OR-circuit 22 having its other input connected via a conductor 24 to the terminal 6a of the manual pulse selector and generator 6. The output of the OR-circuit 22 is connected to one input of an output stage 25 for the change-up pulses, the output of which stage is connected via a conductor 26 to the pulse control member 4.

Similarly, the output of AND-gate 16 is connected to one input of a two-input OR-circuit 27 having its other input connected via a conductor 28 to the output of a safety circuit 29. This circuit is connected on the one hand to the terminal 6b of the manual pulse selector and generator 6 and on the other hand to the aforesaid five lines PM, R1, R2, R3 and R4. The output of OR-circuit 27 is connected to the input of a change-down pulse output stage 31 having its output connected via a conductor 33 to the pulse control member 4.

Now the operation of the electronic control circuit of this invention will be briefly described.

Assuming that the driver of the vehicle sets the control hand lever 7 in the manual control position MAN, the terminal 6c will rise to a potential which, through conductor 17, will block both AND gates 14 and 16. These gates are thus closed and the automatic pulses cannot flow therethrough, as will be explained presently.

Under these conditions, to engage a gear, the driver must actuate the manual pulse selector and generator. To change up to a higher gear the driver depresses the hand lever 7 in the direction of the arrow $f_1$, thus producing a pulse at terminal 6a. This pulse transmitted via conductor 24 is fed through the OR-circuit 22 to the output stage 25 of the change-up pulses which delivers at its output end, to conductor 26, a pulse subsequently fed to control member 4. The latter actuates the distributor 5 of the servo action device 3 in order to engage the next upper gear in the transmission mechanism 2.

A change to a lower gear is obtained in the same manner but in this case the hand lever 7 is lifted in the direction of the arrow $f_2$, thus causing a pulse to be fed to terminal 6b. This pulse transmitted through the safety circuit 29 is fed via conductor 28 to the OR-circuit 27 and thence to the change-down pulse output stage 31. This stage 31 will thus deliver to conductor 33 a pulse acting upon the control member 4 which causes the lower gear to be engaged in the transmission mechanism 2.

Assuming now that the driver sets the hand lever 7 in the automatic position AUTO the blocking voltage will not be applied to terminal 6c and therefore the AND-gates 14 and 16 are not blocked by this inhibition. Under these conditions, the change-up circuits 12, 23 and 34, and the change-down circuits 43, 23, and 21 delivering permanently, at their outputs, automatic change speed pulses as a function of the variations produced in the input control voltage U, one of these pulses being fed, each time a gear change is to take place, to the AND-gate 14 for changing to a higher gear and to AND-gate 16 for changing to a lower gear, can operate when the third condition of AND-gates 14 and 16 is compatible, that is, as long as voltage U is present. These AND gates will then transmit pulses through the relevant OR-circuits 22 and 27 to the output stages 25 and 31. These last-named stages cause the operation of member 4 in the manual control condition.

When control hand lever 7 is in the automatic control position AUTO, the drier can nevertheless actuate this hand lever upwards or downwards for generating control pulses and thus control at will a change to a higher or lower gear, provided that the desired gear change is accepted by the engine.

The hand lever 7 of the manual pulse selector and generator 6 may consist of single key, of the sensitive and short-stroke type.

The device 1 comprises in addition one or more safety and check circuits to be described in detail hereinafter with reference to FIG. 2 and having the purpose of preventing any mismaneuver likely to prove detrimental to the vehicle's engine.

The device according to the present invention which has been described hereinabove will thus provide, at the driver's choice and/or as a function of road conditions:

a. a manual control operation by electric pulses for changing the gear ratios (provided that this change is compatible with the engine safety when changing to a lower gear);

b. a purely automatic control operation, that is, the driver has only to care for the steering of the vehicle, regulating its speed by depressing or releasing the accelerator pedal, applying or releasing the brakes, the gear changes being accomplished without any intervention from the driver but as a function of road conditions and power demand conditions;

c. a combined automatic and manual control operation; in this case, the control lever 7 or key 7 being in the AUTO position, actuating this lever or key 7 will enable the driver to change to one or more higher gears, or to one or more lower gears, as permitted however by the engine r.p.m. value.

Figure 2:
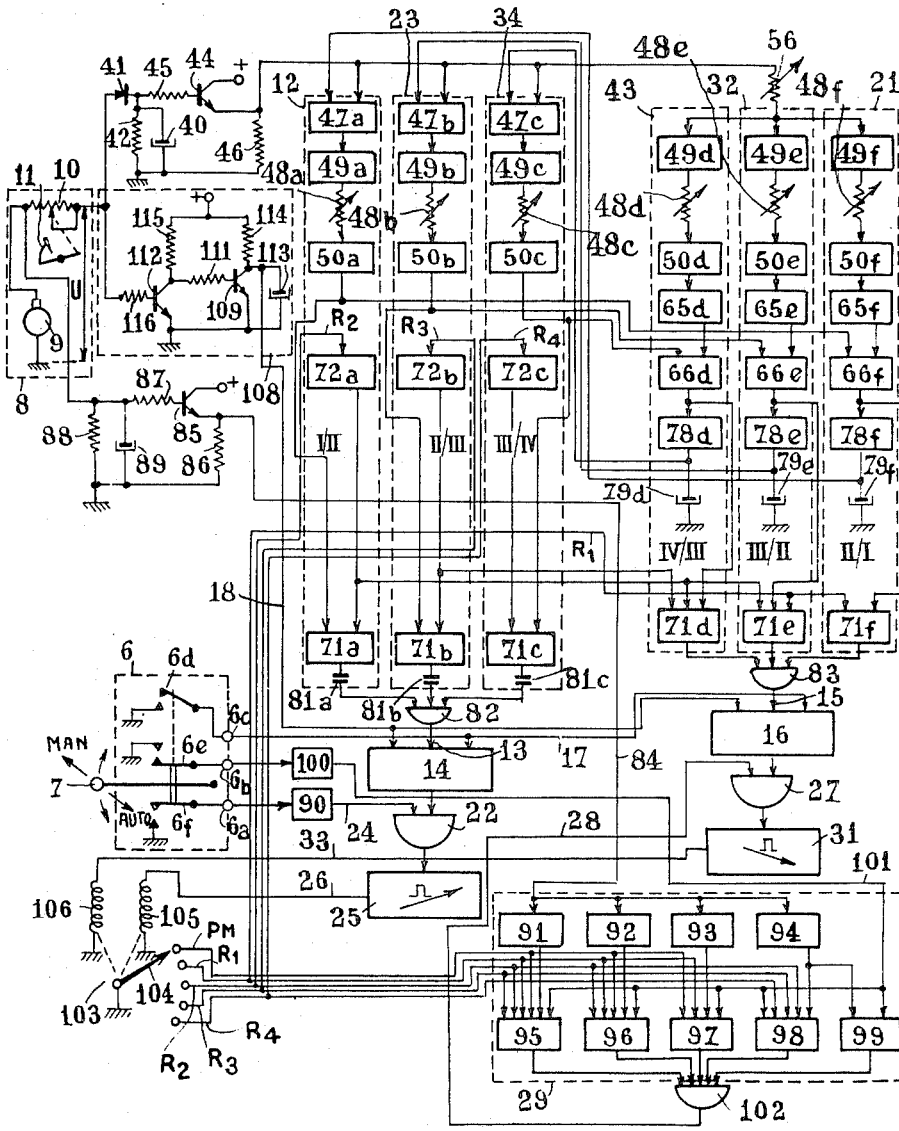
FIG. 2 is a wiring diagram of the electronic control device.

Now reference will be made more particularly to the wiring diagram of FIG. 2 showing a particular form of embodiment of the electronic control device of this invention. In this FIG., the component elements similar or corresponding to those of FIG. 1 are designated by the same reference numerals.

The circuit 1 for treating the input information signals comprises a stabilized power supply (not shown) having its input terminals connected to the positive and negative terminals of the storage battery of the vehicle. If this battery is of the +12-volt type the stabilizer power supply will deliver, say, a voltage of +10 volts which it used for energizing the various components elements of the circuit. In a particular but not limiting form of embodiment these elements operate according to a positive logic, in that the logic level "0" corresponds to 0 volt and the logic level "1" corresponds to +10 volts. The operative control fronts occur only for passing from the "0" state to the "1" state, i.e., from 0 volt to +10 volts.

As already explained in the foregoing, the control voltage U delivered by the generator 8 is fed to a diode 41 having its cathode grounded through a resistor 42 and a filter capacitor 40, and also to the base of a transistor 44 via another resistor 45. This transistor 44 as well as the other transistors employed in the other parts of the circuits is of the NPN-type and has its collector connected to the +10-volt terminal of the stabilizer power supply. The emitter of transistor 44 has one end grounded via a resistor 46, and its other end connected to the three AND-gates 47a, 47b and 47c forming part of the gear change-up circuits 12, 23 and 34 respectively. Since these circuits have the same composition, only one of them will be described in detail, namely circuit 12 associated with the change from low gear to second gear (and denoted I/II). The corresponding elements of the gear change-up circuits 12, 23 and 34, as well as those of the gear change-down circuits 43, 32 and 21 are designated by the same reference numeral with the letters a, b, c, d, e and f as suffix in each case, respectively. The change-up circuit 12 for changing from low or first gear to second gear will thus comprise in succession the input AND-gate 47a, an impedance adapter stage 49a, a potentiometer or variable resistance 48a and a level detector 50a consisting of a Schmitt's flip-flop. Exemplary forms of embodiment of stage 47a and 49a are illustrated in detail in FIGS. 4 and 5 respectively.

Figure 4:
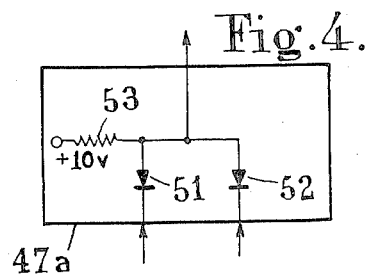
FIG. 4 is a detailed wiring diagram of an AND logic gate.

The two-input AND-gate 47a illustrated in FIG. 4 comprises a pair of diodes 51, 52 having their cathodes connected separately to the two inputs of the gate, respectively, and third anodes jointly connected to the output of this gate. The anodes of the two diodes 51 and 52 are also connected via a resistor 53 to the +10-volt terminal. All the AND gates of the device are assembled according to this specific mounting. The circuits 23 and 34 comprise similar AND-gates 47b and 47c having their outputs connected to the impedance adapter stages 49b and 49c, respectively.

Figure 5:
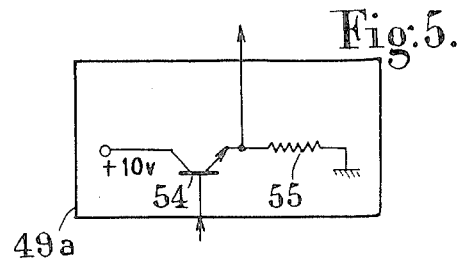
FIG. 5 is a wiring diagram showing an impedance adapter stage.

The impedance adapter stage 49a illustrated in FIG. 5 comprises a transistor 54 having its base connected to the input of this stage, its collector connected to the +10-volt terminal and its emitter grounded through a resistor 55 and connected to the stage output. Circuits 23, 34, 43, 32 and 21 comprise impedance adapter stages 49b, 49c, 49d, 49e and 49f identical with stage 49a, respectively. The inputs of stages 49d, 49e and 49f are connected to a common input potentiometer 56 connected on the other hand to the emitter of transistor 44.

Figure 6:
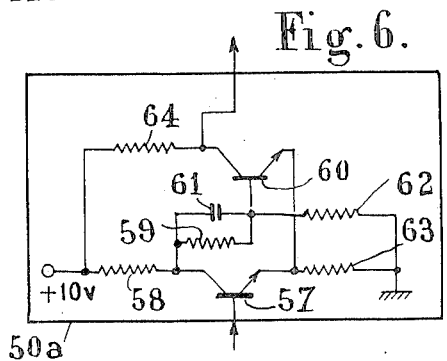
FIG. 6 is a wiring diagram of a level detector stage consisting of a Schmitt's flip-flop.

The above-mentioned six circuits comprise level detector stages 50a to 50f respectively, connected to the outputs of the corresponding impedance adapter stages via adjustment potentiometer or variable resistors 48a, 48b, 48c, 48d, 49e and 49f respectively. All these level detectors are identical, therefore only one of them will be described in detail with reference to FIG. 6. In this Figure it will be seen that this level detector stage consists of a Schmitt's flip-flop comprising two transistors 57 and 60. The stage input is connected to the base of transistor 60 via a resistor 59 and a capacitor 61 connected in parallel, and this base is grounded via another resistor 62. The emitter of both transistors are jointly grounded via another resistor 63. Finally, the collector of transistor 60 is connected to the +10-volt terminal via a resistor 64 and also directly to the stage output.

From the above description it will be seen that the selectively attenuated control voltage U is fed to the inputs of the seven detector stages 50a, 50b...50f. The separate trigger thresholds of the various stages 50a to 50f are adjusted by means of the various potentiometers or resistors 48a to 48f and 56. The use of Schmitt's flip-flops 50a to 50f is advantageous in that these constitute very economical circuit means adapted for use as analogical level detectors. On the other hand, as will be explained presently, the circuit logic contemplated is such that the chief inconvenience of this mounting, which is the well-known hysteresis effect, is definitely eliminated.

The outputs of AND-gates 50d, 50e and 50f of change-down circuits 43, 32 and 21 are connected to the inputs of NOT-gates 65d, 65e and 65f respectively, having their outputs connected to the first inputs of two-input AND-gates 66d, 66e and 66f.

Figure 7:
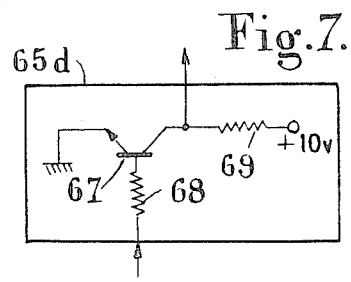
FIG. 7 is a wiring diagram of a NOT logic gate.

A diagram of a typical form of embodiment, given by way of illustration but not of limitation, of a NOT gate is shown in FIG. 7. This NOT-gate 65d comprises a transistor 67 having its base connected via a resistor 68 to the stage input. The emitter of this transistor is grounded and its collector is connected via another resistor 69 to the +10-volt terminal and is also connected to the stage output.

The second inputs of said three AND-gates 66d, 66e and 66f are connected to the outputs of eleven detectors 50c, 50b and 50a of change-up circuits 34, 23 and 12, respectively. The outputs of these three level detectors 50a, 50b and 50c are also connected to the first inputs of three two-input AND-gates 71a, 71b and 71c respectively. The second inputs of these AND gates are connected to the outputs of shaping and timing stages 72a, 72b and 72c having their inputs connected to lines R2, R3 and R4, respectively.

Figure 8:
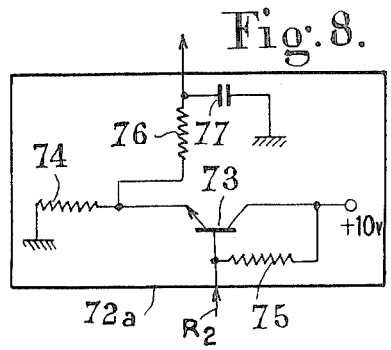
FIG. 8 is a wiring diagram of a shaping and timing stage.

FIG. 8 illustrates a diagram of an exemplary form of embodiment of a shaping and timing stage such as 72a. This stage comprises a transistor 73 having its base connected to the stage input, that is to line R2, and its emitter grounded via a resistor 74. Another resistor 75 is connected between the base and collector of the transistor which is connected in turn to the +10-volt terminal, and the emitter is connected via a resistor 76 to the stage output. Furthermore, this output is grounded via a capacitor 77.

In the change-down circuits 43, 32 and 21 the outputs of AND-gates 66d, 66e and 66f are connected on the one hand to first inputs of three-input AND-gates 71d, 71e and 71f, respectively, and on the other hand to NOT-gates 78d, 78e and 78f. The outputs of these three gates are respectively grounded via capacitors 79d, 79e and 79f, and also to second inputs of the aforesaid AND-gates 47c, 47b and 47a.

On the other hand, the output of the impedance adapter and timing stage 72a is connected to a second input of each AND-gate 71d and 71e, the output of stage 72b is connected to a third input of AND-gate 71d, and line R1 is connected to a third input of AND-gate 71e and to a second input of AND-gate 71f.

The outputs of the three AND-gates 71a, 71b and 71c are connected via capacitors 81a, 81b and 81c respectively to the three inputs of an OR-circuit 82 having its output connected via conductor 13 to the first input of AND-gate 14.

Similarly, the outputs of the three AND-gates 71d, 71e and 71f are connected directly to the corresponding inputs of a three-input OR-circuit 83 having its output connected via conductor 15 to the first input of AND-gate 16.

The output terminal 6c of the manual pulse selector and generator 6 is connected in this selector to a normally open contact 6d adapted to be closed and therefore to ground the terminal 6c when key 7 is moved to its MAN or manual position. This terminal 6c is connected to the second inputs of AND-gates 14 and 16 having their third inputs connected to conductor 18.

The other two terminals 6b and 6a of selector 6 are connected within this selector to contacts 6a and 6f respectively which are normally open and adapted to be closed for grounding the corresponding terminals when the hand lever or key 7 is actuated in one or the other direction. The terminals 6a and 6b are also connected via NOT-gates 90 and 100 to an input of OR-circuit 22 and to a conductor 101 connected to the safety circuit 29.

The two inputs of OR-circuit 27 are connected to the output of AND-gate 16 and via a conductor 28 to the output of safety circuit 29, respectively. The input of safety circuit 29 is connected via a conductor 84 to the emitter of a transistor 85 having its collector connected to the +10-volt terminal. The emitter of this transistor is grounded through a resistor 86 and its base is, on the one hand, connected via a resistor 87 to the output of the tachometric generator 9 and on the other hand grounded via parallel-connected resistor 88 and capacitors 89.

The safety circuit 29 comprises four level detector stages 91, 92, 93 and 94 having their inputs jointly connected to conductor 84. These detectors providing NOT or inhibit functions simultaneously may be constructed for example as shown in the diagram of FIG. 7. The outputs of these four level detector stages 91 to 94 are connected to inputs of AND-gates 95, 96, 97 and 98 respectively. The output of stage 94 is also connected to the input of another AND-gate 99. The five AND-gates 95 to 99 have each an input connected in common to terminal 6b via a conductor 101 and the aforesaid NOR-gate 100. The AND-gate 95 comprises four other inputs connected to lines PM, R1, R2, R3, respectively; AND-gate 96 comprises three other inputs connected to lines PM, R1 and R2, respectively; gate 97 comprises two other inputs connected to lines PM and R1, respectively, and gate 98 comprises three other inputs connected to lines R2, R3 and R4, respectively.

The outputs of the five AND-gates 95 to 99 are connected to the five inputs of an OR-circuit 102 having its output connected to conductor 28.

The five lines PM, R1, R2, R3 and R4 are connected to the corresponding contact studs or fixed contacts of a rotary switch 103 comprising a grounded movable slide or contact arm 104. This movable arm 104 is adapted to be moved stepwise, in conjunction with the distributor 5 of the transmission mechanism servocontrol device 3 (FIG. 1), in the gear change-up direction, by means of an electromagnet 105 connected to the output of stage 25 via conductor 26, and in the gear change-down direction by means of another electromagnet 106 connected to the output of stage 31 via conductor 33.

As already explained in the foregoing the AND-gates 14 and 16 comprise each a third input connected via a conductor 18 to a safety circuit 108 connected to the output of the generator 8 of control voltage U. More particularly, the aforesaid conductor 18 is connected via a resistor 111 to the collector of another transistor 112. The emitter of both transistors 109 and 112 are grounded and a capacitor 113 is connected between the collector and emitter of transistor 109. On the other hand, the collectors 109 and 112 are connected to the +10-volt terminal through resistors 114 and 115 respectively The base of transistor 112 is connected via a resistor 116 to the output of the general control voltage generator 8.

Figure 10:
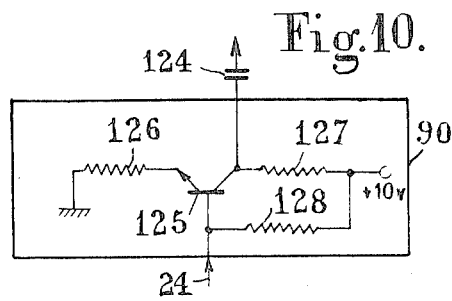
FIG. 10 is a wiring diagram of a modified form of embodiment of a stage providing an impedance adaptation and a NOT logic gate.
Figure 9:
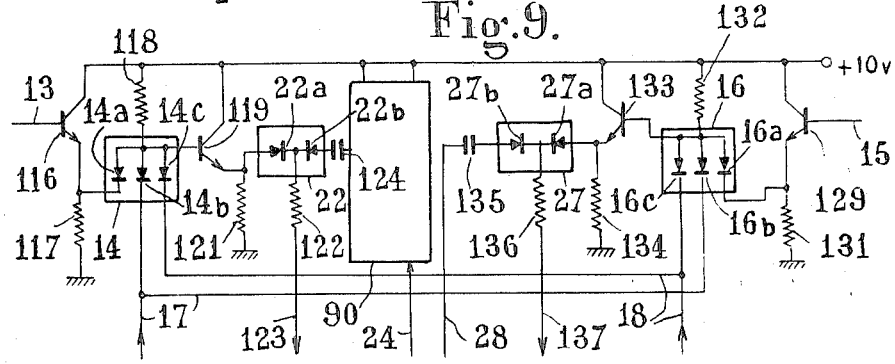
FIG. 9 is a wiring diagram of the AND and OR gates connected to the output stages.

Now reference will be made to FIG. 9 to describe a typical and exemplary form of embodiment of the assembly comprising the two AND-gates 14 and 16, and the two OR-circuits 22 and 27. Conductor 13 connected to the output of OR-circuit 82 is connected to the base of a transistor 116 having its emitter grounded via a resistor 117 and also to a diode 14a of the three-input AND-gate 14. This AND gate further comprises other diodes 14b and 14c and the anodes of these three diodes have their common point connected through a resistor 118 to the +10-volt terminal. The diode 14b is connected to conductor 17 connected in turn to terminal 6c and diode 14c is connected to conductor 18. The output of AND-gate 14 is connected to the base of a transistor 119 having its collector and emitter connected to the +10-volt terminal and to ground, respectively, the former directly and the latter via a resistor 121. This emitter is also connected to the anode of a diode 22a inserted in the OR-circuit 22 which comprises another diode 22b. The junction point of the cathodes of these diodes is connected via a resistor 122 to a conductor 123 connected to the output stage 25 of the change-up pulses. On the other hand, the diode 22b is connected via a capacitor 124 to the NOT1gate 90. This stage, as shown in FIG. 10, comprises a transistor 120 having its emitter grounded via a resistor 126 and its collector connected to capacitor 124 and to the +10-volt terminal via a resistor 128, and also to conductor 24 connected to terminal 6a. The other NOT-gate 100 is constructed like the NOT-gate 90.

Regarding the circuit contemplated for gear change-down operations, it comprises the same structure and a transistor 129 having its base connected to conductor 15 and its emitter grounded via a resistor 131, the collector of this transistor 129 being connected to the +10-volt terminal. This emitter is also connected to a diode 16a of AND-gate 16 comprising two other diodes 16b and 16c connected to conductors 17 and 18, respectively. The junction point of the anodes of these diodes is connected on the one hand to the +10-volt terminal via a resistor 132 and on the other hand to the base of a transistor 133 having its emitter grounded to a resistor 134. The emitter of this transistor is connected to the anode of a diode 27a of OR-circuit 27 having another diode 27b connected via a capacitor 135 to conductor 28. The junction point of cathodes 27a and 27b is connected via a resistor 136 and a conductor 137 to the input of the output stage 31 of the change-down pulses.

Figure 11:
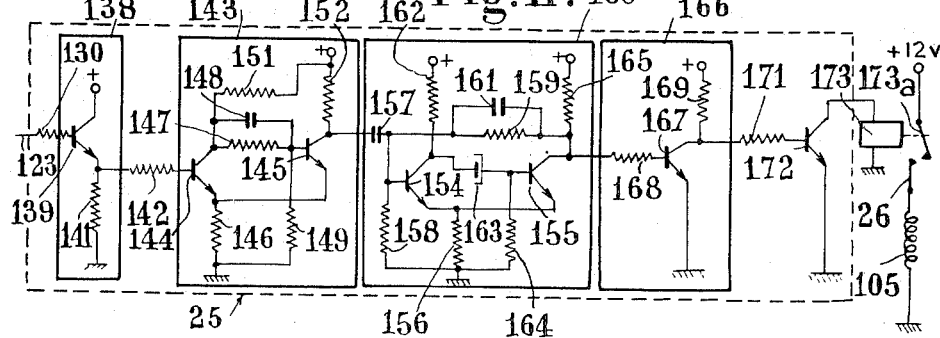
FIG. 11 is a wiring diagram of an output stage.

Now reference will be made to FIG. 11 to describe an exemplary form of embodiment of the change-up pulse output stage 25, stage 31 being constructed in the same manner. The conductor 123 connects the output of OR-gate 22 to the input of an impedance adapter and immunization stage 138 and more particularly to a base resistor 130 of a transistor 139 having its emitter grounded via a resistor 141, the collector of this transistor being connected to the +10-volt terminal. The emitter of transistor 139 is also connected through a resistor 142 to the input of a shaping flip-flop 143 comprising two transistors 144 and 145. The emitter of these two transistors are grounded through a resistor 146 and the collector of transistor 144 is connected to the base of transistor 145 via a resistor 147 and a capacitor 148 in parallel. The base of transistor 145 is grounded via a resistor 149 and other resistors 151 and 152 are provided for connecting the collectors of transistors 144 and 145 to the +10-volt terminal, respectively. The output signal of the shaping flip-flop 143 is picked up from the collector of transistor 145 and fed to the input of a monostable multivibrator 153. This multivibrator comprises two transistors 154 and 155 having their emitters grounded through a resistor 156. The collector of transistor 145 is connected through a capacitor 157 to the base of transistor 154 connected in turn to the ground via a resistor 158. The aforesaid capacitor 157 is connected through a resistor 159 and a capacitor 161 in parallel therewith to the collector of transistor 155. The collector of transistor 154 is connected to the +10-volt terminal through a resistor 162 and through a capacitor 163 to the base of transistor 155 which is also connected through a resistor 164 to the ground. The collector of transistor 155 is connected on the one hand via a resistor 165 to the 10-volt terminal and on the other hand to the input of a reversing stage 166. This stage 166 comprises essentially a transistor 167 having its base connected through a resistor 168 to the collector of transistor 155. The emitter of transistor 167 is grounded and its collector is connected on the one hand through a resistor 169 to the +10-volt and on the other hand through another resistor 171 to the base of a power transistor 172 having its emitter grounded and its collector connected to a relay 173. This relay 173 controls a front contact 173a connected in series to conductor 26 leading in turn to electromagnet 105.

Figure 3:
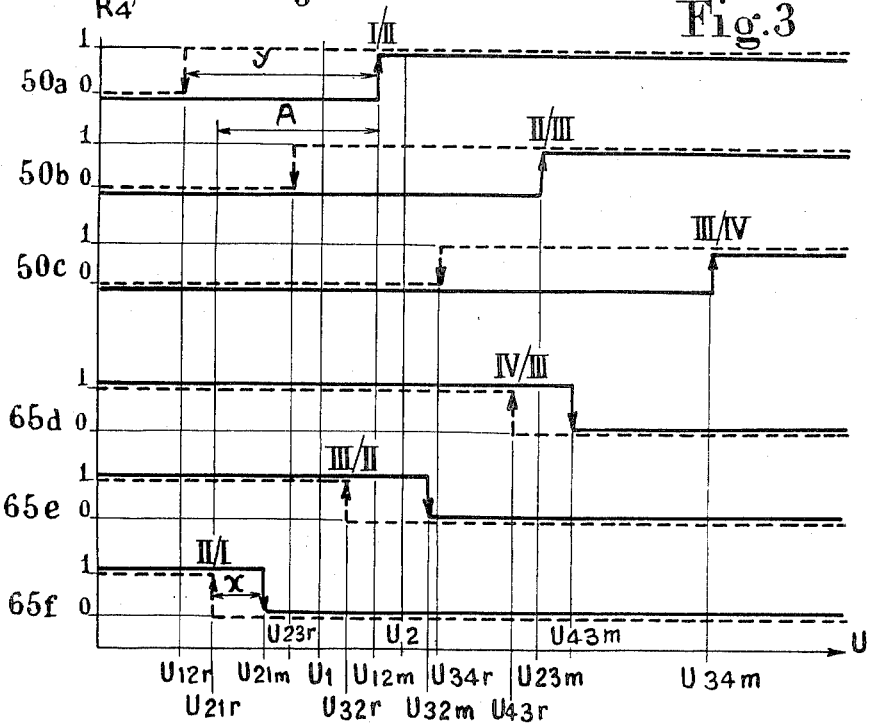
FIG. 3 is a diagram showing the conditions of the level detector stages of the circuits for changing speeds up and down, as a function of the control voltage.

Now, the operation of the electronic control device of this invention will be described by assuming that the key 7 of the manual pulse selector and generator 6 is in the automatic operation position denoted AUTO. Reference may also be made to the diagram of FIG. 3 illustrating the logic conditions produced at the outputs of the level detectors 50a, 50b, and 50c of the relevant circuits 12, 23 and 34 for changing up to a higher gear, and to the outputs of reversing switches 65d, 65e and 65f of the relevant circuits 43, 32 and 21 for changing down to a lower gear ratio. The logic states "0" and "1" correspond to +0-volt and +10-volt voltages, respectively, and it may be reminded that only the change from state "0" to state "1" is operative, the reversing change from state "1" to state "0" having no influence whatsoever on the output circuits.

Firstly, the simple case of the change to a higher gear and to a lower gear will be discussed by assuming that the vehicle is initially still. Under these conditions, the engine cannot be started unless the transmission mechanism is in neutral, that is, when the slide or rotary arm 104 of rotary switch 103 engages contact stud PM. If any gear is engaged, the driver controls the return to neutral either automatically by means of a circuit (not described so far) or manually by depressing the hand lever or key 7 for causing the delivery of the necessary number of pulses.

Once the rotary arm 104 returned in the neutral position, PM, the driver can start the engine of the vehicle. In this case he subsequently engages the first or low gear of the stepped-gear transmission mechanism by controlling the key 7 in order to close contact 6f. This is attended by the emission from terminal 6a of a pulse transmitted through the OR-circuit 22 to stage 25, so that the electromagnet 105 becomes energized. This electromagnet 105 thus actuates the servo action device 3 causing the engagement of the first or low gear and at the same time the rotation of the rotary arm 104 from position PM to position R1, whereby the line R1 is grounded. However, the engine remains disconnected from the transmission through any suitable device, as long as it revolves at idling speed.

When the driver depresses the accelerator pedal, the vehicle is started off from rest and its speed increases. The tachometric generator 9 then delivers an increasing voltage proportional to the speed of the vehicle and the analogical/control voltage U delivered by the generator 8 increases from zero value. It will be assumed for the time being, that the AND-gates 47a, 47b and 47c are open and that, consequently, the analogical control voltage U selectively attenuated by the potentiometers or resistors 48a to 48f and 56 is thus fed in parallel to the six level detectors 50a to 50f, respectively.

For well-known reasons governing a proper operation of the vehicle, the voltage thresholds whereat the gear changes take place are higher when changing up to a higher gear than the corresponding thresholds when changing down to a lower gear, these various thresholds being selectively adjusted by means of the aforesaid potentiometers or resistors. In other words, if we consider the diagram of FIG. 3 in which the analogical control voltage U is plotted in abscissa (the changes in the state of the level detectors which correspond to the changes to a higher speed being shown in thick lines and those corresponding to downward gear changes being shown in dash lines), it will be seen that the change from first or low speed to second speed, denoted I/II, takes place when the output of level detector 50achanges from state "0" to state "1," i.e., under a voltage U12m. Due to the hysteresis effect inherent to the Schmitt's flip-flop mounting the level detector stage 50a reverts from state "1 to state "0" when changing down to a lower speed for a voltage threshold U12r definitely lower than the voltage threshold U12m. On the other hand, considering the output of NOT-gate 65f which is connected to the detector stage 50f for detecting the change from first or low gear to second gear (or I/II), it will be seen that its output changes from state "1" to state "0" for a voltage threshold U21m lower than U12m, and that when changing to a lower gear this output changes from state "0" to state "1" at a voltage U21r lower than U21m but higher than U12r. The same applies to the other level detectors, the corresponding voltage thresholds being designated in the diagram by the two numerals denoting the gear change with in addition the letter m when changing up to a higher gear and the letter r when changing down to a lower gear.

Under these conditions, when the vehicle accelerates in first or low gear, the first level detector undergoing a change in state is the Schmitt's flip-flop 50f when the voltage reaches the value U21m and the output of NOT-gate 65f changes from state "1" to state "0." However, this change in state is inoperative since the AND-gate 66f is responsive only to "1" logic states.

When the logic control voltage attains the value U12m, the level detector 50a is tilted and its output changes from state "0" to state "1" (change I/II). This logic state "1" is transmitted through AND-gate 71a (assumed to be released at that time), then the pulse formed by the bypass capacitor 81a is directed through the OR-circuit 22, AND-gate 14 and OR-circuit 22 and thus applied to the output stage 25 which will then product a pulse transmitted via conductor 26 to electromagnet 105. This electromagnet 105 controls the distributor 5 of the servo action system 3 and causes the engagement of the second gear of the transmission mechanism.

Then, as the vehicle continues to accelerate, the same process is repeated; in other words, when the voltage rises to the value U23m corresponding to the voltage threshold causing this change from second gear to third gear (II/III), the level detector 50b is tilted and causes as in the preceding case the emission of a pulse fed to electromagnet 105. The latter then controls the engagement of the third gear in the transmission mechanism.

When the analogical control voltage rises again to a value U34m corresponding to the voltage threshold causing the change from third gear to top gear (III/IV), it is the level detector 50c that tilts and causes the engagement of the fourth or top gear.

During the upward gear change the state of the output of reversing or NOT-gate 65e changes from "1" to "0" when the voltage U43m lies between U23m and U34m.

However, these changes in state have no consequence whatsoever, as already explained in the foregoing.

Now it is will be assumed that the vehicle is being driven in top gear and that its speed is decreasing. The first level detector to tilt is not the detector 50c associated with the change from third to top gear (III/IV), but the detector 50d associated with the change from top to third gear (IV/III) for a voltage value equal to U43r. In fact, the three level detectors 50a, 50b and 50c associated for controlling the upward changes have been so selected as to display a considerable hysteresis effect. When the level detector 50d is tilted, for a voltage value equal to U43r, the output of reversing or NOT-gate 65d changes from state "0" to state "1" and this logic state transmitted through AND-gates 66d and 71d is fed through OR-circuit 83 to the AND-gate 16 and through OR-circuit 27 to the output stage 31. The output stage 31 delivers a pulse fed to the electromagnet 106 controlling the engagement of the third gear in the transmission mechanism and the simultaneous shifting of contact arm 104 to contact stud R3.

If the vehicle's speed further decreases the same process as described hereinabove is repeated and when the analogical control voltage attains the value U32r (threshold of change from third gear to second gear or III/II) this level detector will tilt to cause a pulse to be transmitted from the output stage 31 and thus control the engagement of the second gear of the transmission mechanism. Similarly, when the voltage drops to value U21r (threshold of change from second gear to low or first gear = II/I) the level detector 50f is tilted in turn and causes another pulse to be transmitted and thus the engagement of the lowest gear of the transmission mechanism. Thus, the simple cycle of gear changes, both upwards and downwards, is completed and the vehicle is again operated in first or low gear.

Now the manner in which the gear change-down action is operatively dependent on the gear change-up action will be described. In fact, it is necessary to prevent the engagement of a lower gear preliminary to a change up to a higher ratio, for the same pair of ratios, but on the other hand this gear change to a lower ratio should be allowed to take place thereafter. It will be assumed that the vehicle is initially still with the first speed engaged in the transmission mechanism, then that the engine speed is accelerated until the analogical control voltage attains a value U1 within the limits U21m to U12m. It will be seen in the diagram of FIG. 3 that the order for changing from first or low gear to second gear has not been given so far; in other words, the output of sleeve detector 50a is still in the "0" state, but on the other hand the level detector 50f has been triggered, that is, the output of inverter 65f is in the state "P." Assuming now that the vehicle speed decreases so that the analogical control voltage drops from U1 to value U21r, a gear change-down pulse could take place at this time and this pulse would restore the transmission mechanism to neutral.

The AND-gates 66d, 66e and 66f have been provided to avoid this difficulty. Considering the AND-gate 66f, it will be seen that one input of this gate is connected to the output of level detector 50a. Consequently, this AND-gate 66f is conductive only if the output of level detector 50a is in the logic state "1," i.e., if the trigger threshold from first gear to second gear (I/II) represented by the voltage U12m has been attained. Therefore, it is clear that with the above assumption the deceleration attended by the voltage reduction from U1 to U21r has no detrimental consequence since the gate 66f is blocked by the logic state "0" obtained at the output of level detector 50a and therefore the change in state of detector 50f for said voltage U21r is not transmitted through this gate.

The other gates 66e and 66d have the same function as gate 66f respectively, in connection with the change from third gear to second gear and from fourth gear to third gear.

In FIG. 3 it will be seen that advantage is taken of the hysteresis property of the Schmitt's gear change-up flip-flops 50a, 50b and 50c for ensuring the necessary safety of the mounting. In fact, this hysteresis acts as a memory with respect to the preceding state. The condition to be met for a proper operation, which determines the magnitude of this hysteresis, is that $U12r<U21r$, $U23r<U32r$ and $U34r<U43r$. Considering now in the diagram of FIG. 3 the fraction A showing the speed discrepancy (given a constant accelerator pedal position) whereat the gear changes take place in either direction (for example the discrepancy between the change from first to second gear I/II and the change from second to first gear II/I), it will be seen that for a given fraction A the hysteresis $x$ of the Schmitt's flip-flops for changes down to a lower gear and the hysteresis $y$ of the Schmitt's flip-flops for changes up to an upper gear should adhere to the equalities $y>A$ $x<A$.

Now the manner in which the upward change action is operatively subordinate to the downward change action will be explained. In fact, for a same pair of gear ratios (for example first and second, and second and first), it is necessary that an upward change compulsorily takes place after a downward change under any circumstances.

Considering again the diagram of FIG. 3 and assuming that the vehicle is driven in first or low gear at an increasing speed, the change from first to second gear I/II takes place when the voltage value is U12m. If after attaining a voltage U2 higher than U12m the vehicle is caused to decelerate, the change from second to first gear II/I will take place when the voltage has dropped to valve U21r. However, at this time the output of level detector 50a will still be in state "1," due to the hysteresis of Schmitt's flip-flop, and this output will resume it s state "0" only when, following an additional deceleration, the voltage drops to said valve U21r. Once the output of said level detector 50a has resumed its state "0," the assembly will operate normally in case of reacceleration.

On the other hand, if during a vehicle deceleration and a voltage reduction from U21r to U12r the driver reaccelerates the engine, the output of the Schmitt's flip-flop 50a remains in state "1" and no change from first to second could be effected if an additional circuit were not contemplated. This additional circuit comprises three inverters 78d, 79e and 78f and three AND-gates 47a, 47b and 47c. Therefore, when the decreasing analogical control of voltage is at value U21r, the output of NOT-gate 65f changes to state "1" and the same applies to AND-gate 66f, thus controlling the change from second gear to first or low gear as explained hereinabove. The logic state "1" present at the output of AND-gate 66f is converted through the NOT-gate 78f into a logic state "0" applied to the input of NOT-gate 47a, whereby this gate is blocked. The corresponding level detector, i.e., detector 50a, will then receive a zero voltage at its input as if the vehicle has been brought to a complete standstill, and will trigger to the "0" state.

When the Schmitt's flip-flop 50a associated with the change from first to second gear has resumed its "0" state, its output in state "1" will block the AND-gate 66f, the output of inverter 78f will change to state "1" and the input gate 47a is blocked, whereby the change from first to second gear can subsequently take place normally.

The NOT-gates 78e and 78d have the same function with respect to the relevant gates 47b and 47c, as NOT-gate 78f in relation to gate 47a, in the case of gear changes II/III and III/II on the one hand, and III/IV and IV/III on the other hand.

It will be noted that capacitors 79d, 79e and 79f are connected to the inputs of AND-gates 47a, 47b and 47c connected to the outputs of NOT-gates 78d, 78e and 78f. These capacitors have been inserted in these positions in order to delay the blocking of these gates after the down-change has been made, so that under any possible circumstances (for example when suddenly depressing the accelerator pedal) upward changes cannot take place nearly simultaneously with a downward change.

Finally, and more particularly, this delay or time lag is effective to keep the AND gates and authorizes a safe and reliable change in the state of the corresponding up-change level detector.

The electronic control device according to this invention comprises circuits for recopying or reproducing the engaged gear ratio. These circuits are necessary mainly because the device according to this invention affords several types of operation, namely automatic, automatic-cum-manual, and manual. Moreover, these circuits also serve the purpose of avoiding a possible disturbance in the cycles of operation as a consequence of "refusals" or failures of mechanical or electromechanical origin.

These recopying circuits comprise the already described rotary electric switch 103 having its rotary arm 104 grounded and five contact studs connected to lines PM, R1, R2, R3 and R4.

The lines R2, 53 and R4 are connected within circuits 12, 23 and 34 to the bases of switching transistors such as transistor 73 (FIG. 8) forming part of the sharpening and timing stages 72a, 72b and 72c. When a transmission gear II, III or IV is engaged the corresponding line R2, R3 or R4 is grounded. In this case the bases of the relevant transistor 73 is also grounded, this transistor is blocked and its emitter is in the logic state "0." As can be seen in FIG. 2, the output of stage 72a in state "0" causes the gates 71a, 71d and 71e to be blocked, the output of stage 72b in state "0" causing the blocking of gates 71b and 71d, and the output of stage 72c in state "0" the blocking of gate 71c.

The capacitor 77 (FIG. 8) connected to the output of stage 72a (and of the other corresponding stages) is provided on account of the necessity of delaying the switching to prevent control conditions from changing immediately after the base of said transistor has been grounded.

Now the operation of AND-gate 71e associated with circuit 32 controlling the change from third gear to second gear (III/II) will be discussed by way of example. It will also be assumed that the control device is set for automatic-cum-manual operation, with the third gear engaged and that particular driving conditions induce the driver to actuate the hand lever or key 7 manually to deliver a pulse to terminal 6b in order to control a change to second gear, and that, as an extreme, the driver causes a second pulse to be emitted for changing down to first gear. The manual pulse delivered to said terminal 6b is transmitted through the NOT-gate 100, the safety circuit 29 and OR-circuit 27 to stage 31 which will thus produce a pulse fed to electromagnet 106 for engaging the second speed.

The manual pulse controlling the change down to second gear appears before the automatic pulse controlling the change from third to second gear. Under these conditions, this automatic pulse must be blocked or retained, if it is generated.

After the manual pulse has been delivered for changing from third to second gear, the rotary arm 104 has moved from contact stud R3 to the next contact stud R2, thus grounding the line R2. As already explained in the foregoing, the output of stage 72a will thus assume the state "0," so that gates 71a, 71d and 71e will be blocked. Under these conditions, when the automatic pulse for changing from third to second gear appears normally as a consequence of the deceleration, at the output of gate 66e, it cannot pass through said gate 71e.

In the foregoing the extreme case concerning the emission of a second manual pulse for causing a change from second to low gear was contemplated. Similarly, when the rotary arm 104 is switched from contact stud R2 to contact stud R1, after engaging the first gear, line R1 is regrounded and since this line is connected to one input of gate 71f, the latter is blocked and prevents the passage of the automatic pulse for a change from second to first gear II/I which appears at the output of AND-gate 66f.

Similarly, the gate 71d associated with the gear change IV/III is blocked when one of the lines concerned, R2 or R3, is grounded, and gate 71e is blocked by grounding the line R2 or R1 for ensuring the corresponding safety actions.

The stages 72a, 72b and 72c have the same safety function in relation to gates 71a, 71b and 71c, as far as automatic pulses for producing upward gear changes are concerned.

Now, the mode of operation of the manual pulse selector and generator 6 actuated by means of the key 7 will be described more particularly. In the manual operation position the key 7 closes either contact 6e if the driver wants to engage the next lower gear, or contact 6f if he wants to engage the next higher gear. Terminals 6a and 6b are connected to the bases of reversing transistors such as 125 (FIG. 10) incorporated in NOT-gates 90 and 100. Therefore, when contact 6f is closed (for engaging the next higher speed) the base of transistor 125 of stage 90 is grounded and the collector of this transistor is at potential +10 volts (logic state "1"). The order for an upward change (logic state "1") is transmitted directly to the output stage 25 through the OR-gate 22 for engaging a higher gear ratio, and the order for changing down to a lower gear (with contact 6c closed) is transmitted through the medium of the safety circuit 29 to the output stage 31 through OR-gate 27.

In the automatic-cum-manual operation the key 7 being set in the automatic position both AND-gates 14 and 16 permit of delivering or alternately blocking the automatic control pulses. In fact, to cause these automatic control pulses to be transmitted three-input the output stages they must primarily exist (conductor 13 or 15 in the state "1"), with key 7 in the automatic control position (terminal 6c ungrounded) and the third inputs of AND-gates 14 and 16 also in state "1," this being ensured by a safety circuit to be described presently. The automatic control pulses for changing up to a higher gear are transmitted via the insulating OR-circuit 82 to the conductor 13 and thus fed to the base of an impedance adapter transistor 116 (FIG. 9). The three above-mentioned requirements are not met by the AND-gate 14 shown in detail in this FIG. 9. At the output of AND-gate 14 an automatic change-up pulse passes through the impedance adapter transistor 119, then through the OR-circuit 22, and is subsequently fed to output stage 25.

The same applies in the case of the circuit corresponding to downward gear changes, this circuit comprising, in addition to the three-input AND-gate 16 and the OR-circuit 27, the pair of impedance adapter transistors 129 and 133.

Now the safety circuits provided for protecting the system in case of failure of the pickup devices, and also adapted to become operative in case the driving wheels of the vehicle were locked, will be described in detail. These circuits are so designed that in case of failure of the pickup means or in case the driving wheels of the vehicle were locked, any automatic control pulse subsequent to the incident will be inhibited so that as long as this incident continues the transmission mechanism will remain in the conditions it had before the incident.

The aforesaid safety circuit is denoted 108 in FIG. 2 and connected via capacitor 18 to one input of each AND-gate 14 or 16. Under normal operating conditions, with a voltage present at the output of control-voltage generator 8, transistor 112 is conductive, the potential of its collector is 0-volt and transistor 109 is nonconductive. The collector of this transistor 109 is then at +10-volt potential and this potential (with logic state "1") is fed via conductor 18 to the corresponding inputs of said AND-gates 14 and 16 which are then conductive when the other gates are also in state "1."

On the other hand, if no voltage is available at the output of generator 8 (as a consequence of, say, a failure in this generator or in case the driving wheels were locked), the reverse conditions will be obtained at each stage and conductor 18 is grounded (state "0"), thus causing the gates 14 and 16 to become blocked or nonconductive. Under these conditions, the automatic control pulses cannot flow through these gates. This is tantamount to reverting to the manual control position through electronic means.

The diode 41 connected between the output of generator 8 and the base of transistor 44 transmitting the analogical control voltage serves the purpose of preventing, in case of failure or incident, the filter capacitor 40 from being discharged into the safety circuit 108 and thus produce a timelag in the operation of this circuit.

Capacitor 113 incorporated in said safety circuit 108 is adapted to delay the cancellation of the safety condition when a generator control voltage U is restored. Thus, beats likely to occur, for instance when restoring the contact between previously broken wires, can safely be prevented, as this restoring of contact might cause from zero to three control pulses to be transmitted simultaneously according to the prevailing voltage level.

Now the electronic safety circuit 29 associated with gear change-down operations will be described in detail. In the foregoing it is explained how the manual control pulses are caused to flow through this safety circuit 39 before being directed to the output stage 31 for the change-down pulses.

The function of safety circuit 29 is to inhibit the change down to a lower gear whenever this action might entail an abnormal overstepping of the permissible engine r.p.m. value; this safety circuit is therefore responsive to information concerning the vehicle speed and the transmission ratio engaged at the time of the change-down contemplated. Stages 91, 92, 93 and 94 comprise each a transistor mounted as a level detector according to the diagram illustrated in FIG. 7. The trigger thresholds of the various transistors included in these four stages are set by different values of the base resistances corresponding to resistor 68. The bases of the four transistors of these stages are connected in common via a conductor 84 to the emitter of transistor 85. Therefore, this conductor 84 is applied permanently with a voltage proportional to the voltage of the tachometric generator 9 and therefore to the vehicle speed.

The knowledge of the specific gear ratio engaged in the transmission mechanism is obtained through the so-called "recopying" method, the different lines PM, R1, R2, R3 and R4 being connected to the inputs of AND-gates 95, 96, 97 and 98 in the manner shown in FIG. 2. The AND-gate 95 ensures the safety of gear change IV/III, AND-gate 96 of the safety of gear change III/II, AND-gate 97 the safety of gear change II/I, AND-gate 98 the safety of the change from low gear to neutral, and finally AND-gate 99 provided the safety for the engagement of reverse from neutral.

The operation of AND-gate 96 will now be discussed by way of example in connection with the downward change from third to second gear (III/II). A manual control pulse fed to conductor 101 cannot flow through gate 96 unless the third gear of the transmission mechanism is engaged (as line R3 is not connected to this gate it cannot prevent this change), and unless the voltage level detected by stage 92 is lower than the preset level, so that its output is in the logic state "1" (the transistor of the corresponding stage being blocked).

The logic functions of AND-gates 95 to 98 may be defined as follows:

AND-gate 98=$\overline{R4}, \overline{R3}, \overline{R2}, 94$
AND-gate 97=$\overline{PM}, \overline{R1}, 93$
AND-gate 96=$\overline{PM}, \overline{R1}, \overline{R2}, 92$
AND-gate 95=$\overline{PM}, \overline{R1}, \overline{R2}, \overline{R3}, 91$ When possible the change-down signal is transmitted through one of these AND-gates 95 to 98 and through the OR-circuit 102 so as to be fed to the output stage 31 of the change-down pulses.

According to a modified form of embodiment, a single safety characteristic defined by an information concerning the engine r.p.m. value may be used, the information pulse corresponding to this value being fed to AND-gate 16 to block this gate in case the engine r.p.m. exceeds a predetermined value corresponding to the maximum permissible speed divided by the highest gear ratio between two gears of the transmission mechanism.

Now reference will be made more particularly to FIG. 11 to describe the operation of output stages 25 and 31. These stages receive eventually through the corresponding OR-circuits 22 and 27 either automatic control pulses or manual control pulses resulting in turn either from the automatic position or from the manual position of key 7 of selector 6.

At this point of the circuit there occurs in fact not a change in the active condition but actually a change of pulses, i.e., gated pulses with a more or less steep front (noncalibrated pulses). In fact, the changes of state produced as a consequence of upward changes are converted into pulses as a consequence of the diversion caused by capacitors 81a, 81b and 81c located just upstream of the three-input OR-circuit 82 disposed at the output of the three circuits 12, 23 and 43, respectively.

Although this capacitive connection is not provided in the downward-change circuits 43, 32 and 21, in these circuits a change in the active state is followed almost immediately by a passive change as a consequence of the provision of blocking lines for the AND circuits. In fact, considering for example a change in the active state at the output of change-down trigger 50d of circuit 43, this output will pass from logic state "1" to logic state "0," and the output of inverter 65d will change accordingly from state "0" to state "1." If the other logic condition imposed by AND-gate 66d is met, i.e., if the output of detector 50c is in logic state "1," the change-down pulse is transmitted through AND-gate 66d to the output stage. Simultaneously, the output of inverter 78d changes from state "1" to state "0," thus blocking the input AND-gate 47c and causing the level detector 50c to be triggered to state "0." The output of this detector passing from state "1" to state "0" will block AND-gate 66d. Therefore, the output of this last-named gate will change from state "1" to state "0," so that at the output of this gate a gated pulse will be obtained which remains at level "1" only during a very short time.

The diversion of the manual pulses is obtained by means of a pair of capacitors 124 and 125 (FIG. 9) inserted upstream of OR-circuits 22 and 27, respectively.

Finally, the noncalibrated pulses are firstly adapted as to their impedance by means of transistor 139 (FIG. 11), with common collector, of the impedance adapter stage 138. The base of this transistor is connected via a high-value resistor 130 to the input conductor 123, The function of this resistor is to make this transistor unsensitive to stray pulses likely to occur and having, say, a maximum level of +8 volts. The impedance adapter stage 138 is followed by a sharpening flip-flop 143 serving the purpose of regenerating the rising front of the pulse by making it much steeper or vertical. Then, the monostable multivibrator 153 converts for example the noncalibrated pulse into a rectangular pulse having an amplitude of 10 volts, a duration of 0.4 sec. in the output stage 25 for upward-change pulses and a duration of 0.1 sec. in the output stage 31 for the downward-change pulses. Finally, the reversing transistor 167 restores the preceding pulse in the form of a change from 0 to +10 volts, this pulse being fed to the mean-power transistor 172 controlling the relay 173.

Now a brief description of the manner in which the control device of this invention may be adapted to an automotive vehicle for controlling automatically and/or manually a hydraulic transmission mechanism of change-speed gearbox 2 will be given with reference to FIG. 12 of the drawing. In this Figure the output shaft of the transmission mechanism 2 drives via a flexible cable 181 the tachometric generator 9 detecting the speed of the vehicle. On the other hand, the accelerator pedal 11 is operatively connected through a suitable linkage system comprising links and return springs to the engine throttle valve 20 and also to the sliding contact 10a of potentiometer 10. The general control voltage U is thus produced as in the form of embodiment described in the foregoing, and this voltage is fed to the corresponding input of the signal treatment circuit 1. Besides, terminals 6a, 6b and 6c of the manual pulse selector and generator 6 are connected to the circuit 1 in the manner already described. Both conductors 26 and 33 inserted in the circuit 1 to the output stages 25 and 31 are connected the former to a relay 173 associated with the upward gear changes and the latter to another relay 182 associated with the downward gear changes, respectively. The front contact 173a of relay 173 is connected between the positive terminal + of storage battery 183 of the vehicle and the electromagnet 105, and the front contact 182a of relay 182 is inserted between the positive terminal + of the storage battery 183 and the electromagnet 106. On the other hand, contact 173a is also connected to a solenoid valve 184 associated with a clutch reengagement corrector 185. This corrector 185 controls the supply of hydraulic fluid to a clutch 186 illustrated only in diagrammatic form as comprising a control lever 187 actuated by means of a hydraulic cylinder and piston unit 188 and urged to its engaged position by spring means 189. The clutch reengagement corrector comprises essentially a cylinder and piston unit 191 fed through a throttle device 190 and having its piston rod 192 adapted to actuate a cam 193 rigid with a shaft 194 rigidly supporting the throttle valve 20 and controlled by the accelerator pedal 11.

The solenoid valve 184 controlling the clutch reengagement corrector 185 permits of differentiating the upward-change timings from the downward-change timings. In other words, when a change up to a higher gear takes place, relay 173 is energized and closes its contact 173a whereby the solenoid coil of valve 184 is energized, this valve being thus opened by bypass the throttling device 190 provided in the clutch reengagement corrector 185 so as to impart a normal timelag thereto. On the other hand, when the change is to a lower gear, the energization of relay 182 causes only the energization of electromagnet 106 and the timelag of the clutch reengagement corrector 185 is determined by the throttling circuit 190.

Figure 12:
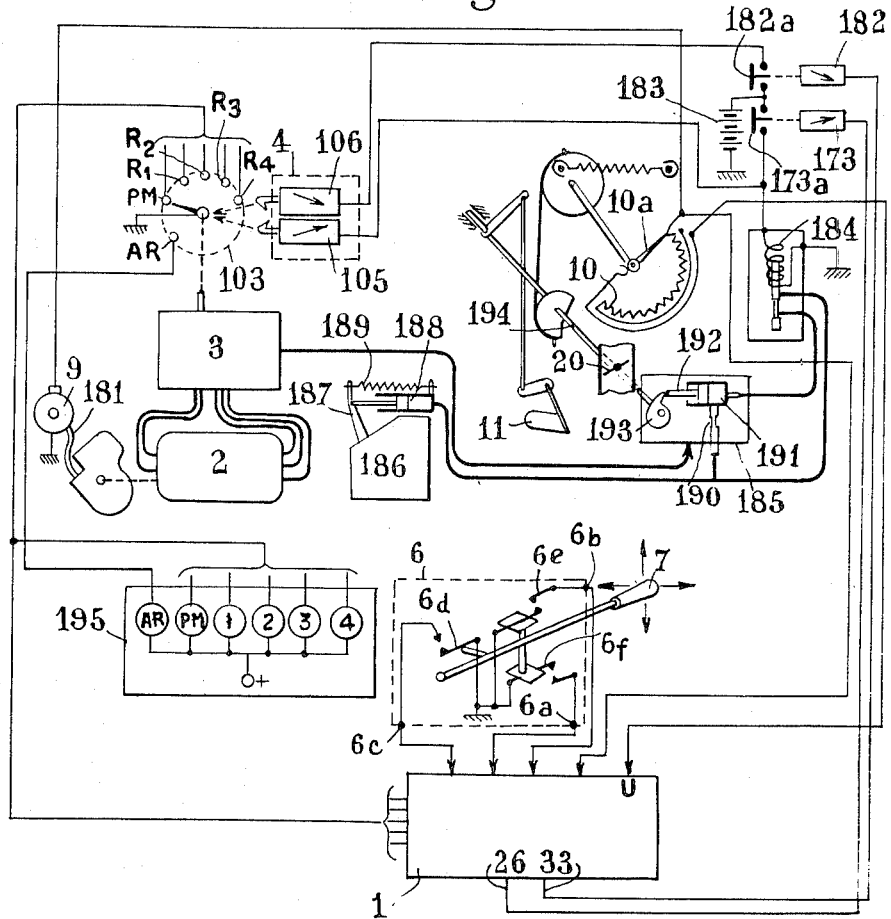
FIG. 12 is a diagram illustrating the use of the control device of this invention for automatically controlling a hydraulic change speed mechanism.

As also clearly shown in FIG. 12 a luminous indicator 195 is provided on the instrument panel of the vehicle and comprises pilot lights corresponding to the reverse AR, the neutral PM, and the gear ratios 1, 2, 3 and 4 of the transmission mechanism, these pilot lights being connected through the relevant lines to the corresponding contact studs AR, PM, R1, R2, and R4 of rotary switch 103.

Figure 13:
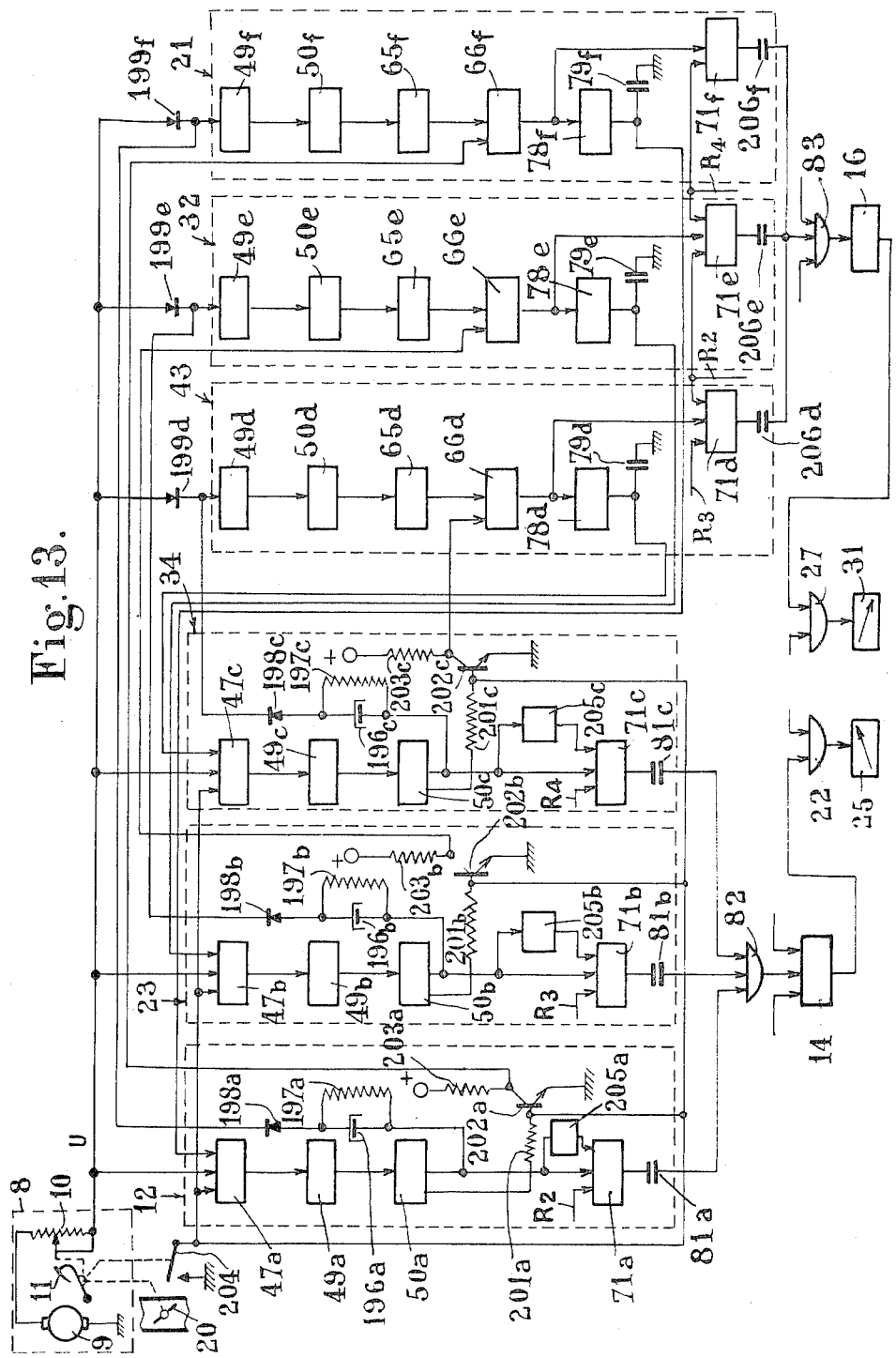
FIG. 13 is a fragmentary wiring diagram of a modified form of embodiment of the circuit for controlling the upward and downward gear changes.

In the modified form of embodiment illustrated in FIG. 13, connecting circuits are provided between the outputs of the Schmitt's flip-flops 50a, 50b and 50c of the three upward-change circuits 12, 23 and 34, and the inputs of the impedance adapter stages 49f, 49e and 49d respectively of downward-change circuits 21, 32 and 43. Otherwise stated, the output of the first Schmitt's flip-flop 50a is connected on the one hand to the input of AND-gate 71a and on the other hand to the input of stage 49f via a circuit comprising a capacitor 196a and a resistor 197a connected in parallel, these capacitor and resistor being themselves connected in series to a diode 198a. Similarly, the output of the second Schmitt's flip-flop 50b is connected to the input of impedance adapter stage 49e through a capacitor 196b and a resistor 197b interconnected in parallel and connected in series to a diode 198b. Finally, the output of the third Schmitt's flip-flop 50c is connected to the input of the impedance adapter stage 49d through the medium of a capacitor 196c and a resistor 197c interconnected in parallel and connected in series to a diode 198c.

Insulating diodes 199d, 199e and 199f are connected between the output of generator 8 delivering the control voltage U and the inputs of stages 49d, 49e and 49f respectively.

Figure 14C:
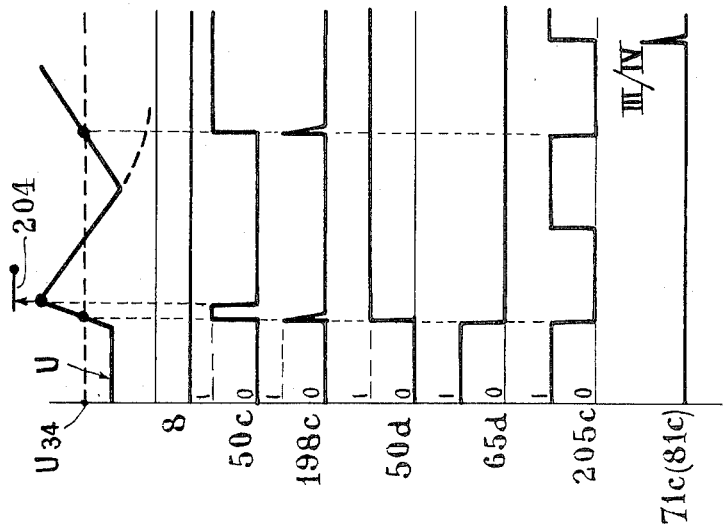
FIGS. 14A, 14B and 14C are diagrams illustrating the shapes of pulses produced in the circuit of FIG. 13, under different operating conditions.
Figure 14B:
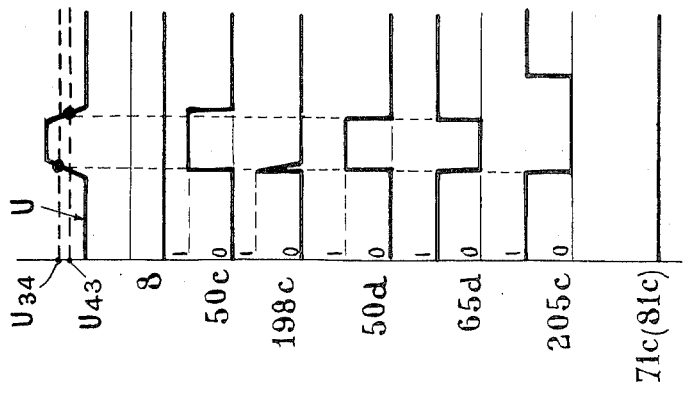
Figure 14A:
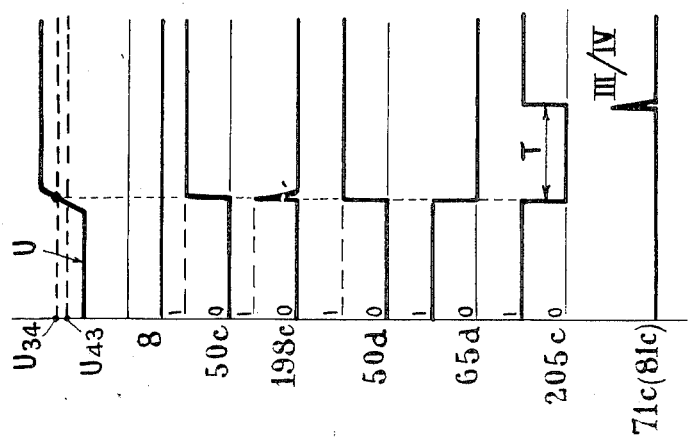

Now the operation of the above-described circuit will be described with reference to the case of gear ratios III/IV, i.e., circuits 34 and 43. FIG. 14A shows the pulse shapes appearing at different points of the circuit, at the output of the component elements of which the reference symbols are given in the left-hand portion of the Figure. If, during the operation of the vehicle, the general control voltage U delivered by generator 8 exceeds the threshold $U_{34}$ contemplated for the automatic change from III to IV gear, the Schmitt's flip-flop 50c will be triggered as explained in the foregoing with reference to the circuit of FIG. 2, and its output will change from logic state "0" to logic state "1." As a result, a pulse is transmitted to the upward-change pulse output stage 25 controlling the engagement of the higher gear. The rising front of the signal denoting the change from state "0" to state "1" which appears at the output of the Schmitt's flip-flop 50c is converted into a pulse by the differentiating circuit consisting of capacitor 196c and the impedance of adapter stage 49d, this capacitor being quickly discharged due to the presence of resistor 197c. The resulting positive pulse is transmitted through diode 198c adapted to isolate the output of the upward-change circuit 34 from the general voltage U normally fed to the input of the downward-change circuit 43.

The positive pulse transmitted through the diode 198c is fed to the input impedance adapter stage 49d and the output of this stage delivers a signal causing the Schmitt's flip-flop 50d of circuit 43 to be switched from its logic state "0" to its logic state "1." As a result, the state of the signal at the output of the reversing stage of NOT-gate 65d is changed from "1" to "0."

Thus, the change-down circuit 43 is switched to state "0" as if, during a short time, the vehicle speed has been considerable; this circuit 43 is thus "reset" and preserves this state "0" and therefore its inherent hysteresis.

Consequently, the above-described circuit affords an automatic resetting of the Schmitt's flip-flops of change-down circuits 43, 32 and 21 immediately as the Schmitt's flip-flop of the homologous change-up circuit 43, 23 or 12 (i.e., the one associated with the same pair of gear ratios in the transmission mechanism) is switched from state "0" to state "1."

In comparison with the mounting illustrated in FIG. 2, the circuit of FIG. 13 introduces a greater flexibility in the selection of the relative positions of the gear up changes and down changes. In fact, in the device illustrated in FIG. 2 the minimum range that can be obtained between the two gear changes corresponding to a same pair of gear ratios of the transmission mechanism, such as II/III and III/IV, is defined by the hysteresis of the Schmitt's flip-flop constituting the level detector stage 50e of down-change circuit 32 associated with this pair of ratios, i.e., the one controlling the change from third gear to second gear in the example contemplated. In certain cases, this limitation is attended by an inadequate or insufficient smoothness of flexibility as far as the choice of the gear changes is concerned. On the other hand, with the circuit illustrated in FIG. 13 the hysteresis of the Schmitt's flip-flops inserted in the change-down circuits is irrelevant and its value is immaterial, or even identical to that of the Schmitt's flip-flops of the change-up circuits, this feature being advantageous in that it permits of standardizing the electronic mountings.

Now the portion of the control circuit which permits of automatically superseding an upward gear change operation when releasing the accelerator pedal will be described.

As can be seen in FIG. 13, the Schmitt's flip-flop 50a, 50b and 50c of upward-change circuits 12, 23 and 34 comprise each, in addition to their normal outputs connected to the gates 71a, 71b and 71c, a complementary output (where a signal opposite to that present at the normal output appears. These complementary outputs are connected through resistors 201a, 201b and 201c respectively to the bases of NPN-type transistors 202a, 202b and 202c having their emitters grounded and their collectors connected to the positive terminal through resistors 203a 203b and 203c, respectively. The collectors of transistors 202a, 202b and 202c are connected to first inputs of AND-gates 66f, 66e and 66d, respectively, of the downward-change circuits 21, 32 and 43, respectively, and the second inputs of these AND gates are connected to the output of NOT-gates 54f, 65e and 65d respectively.

Furthermore, the accelerator pedal 11 controls a contact 204 connected on the one hand to third inputs of AND-gates 47a, 47b and 47c, respectively, of upward-change circuits 12, 23 and 34, and on the other hand to the bases of transistors 202a, 202b and 202c. Contact 204 is a limit-switch contact which closes only when the accelerator pedal 11 is fully released. When it is closed, this contact 204 grounds the third inputs of AND-gates 47a, 47b and 47c, as well as the bases of transistors 202a, 202b and 202c.

Finally, the normal outputs of Schmitt's flip-flop 50a, 50b and 50c are connected to the inputs of the corresponding monostable multivibrators 205a, 205b and 205c having their outputs connected to third inputs of AND-gates 71a, 71b and 71c.

The circuit just described is capable of avoiding the major inconvenience of hitherto known automatic control systems, namely, that when the transmission mechanism is in an intermediate gear, such as second or third speed, in the case of a four-speed transmission, an upper gear is engaged automatically when the driver releases, even momentarily or very slightly, the accelerator pedal. This inconvenience is particularly unpleasant when driving in town, or before negotiating a curve and when driving downhill.

To describe the operation of this circuit it will firstly be assumed that the vehicle is being driven in third speed and that road conditions are such that the driver is compelled or induced to release the accelerator pedal. Due to the movement of the sliding contact or rotary arm of the potentiometer (or rheostat) which is attended by a reduction in the value of the resistor inserted in series therewith, the general control voltage U rises suddenly as shown in FIG. 14A and when this value exceeds the threshold $U_{34}$ contemplated for the automatic change from third to fourth or top gear, the Schmitt's flip-flop 50c is switched and its output passes from the logic state "0" to the logic state "1." This should normally be attended by the engagement of the fourth or top gear, but the above-described circuit permits of avoiding this automatic engagement.

Several hypotheses will now be contemplated:

a. Assuming that the driver releases the accelerator pedal but not completely, for example for stabilizing the vehicle speed (case shown in FIG. 14A).

The input of AND-gate 71c connected to the output of the Schmitt's flip-flop 50c changes from state "0" to state "1" immediately as this flip-flop is switched. However, the input of AND-gate 71c is connected to the output of monostable multivibrator 205c and previously in state "1" will simultaneously change to state "0" since this multivibrator is triggered to its unstable condition by the rising front of the change of state from "0" to "1" at the output of said Schmitt's flip-flop 50c. Therefore, the residual pulse likely to flow through the AND-gate 71c has a negligible energy level and cannot determine a gear change.

On the other hand, after a time period T (for example 2 seconds) has elapsed, which corresponds to the trigger time of monostable multivibrator 205c, the latter resumes its inoperative condition, its output changing to state "1" and the AND-gate 71c is released since its third input connected to line R4 of the recopying device is not grounded—(third speed engaged). The AND-gate 71c can then transmit a differentiated logic state "1" through capacitor 81c for producing a pulse transmitted to the upward-change pulse output stage 25. The change from third speed to fourth or top speed can then take place (denoted III/IV).

Once the upward gear change has occurred, a possible change-down action should be allowed to take place. This is obtained through the coupling circuit between the output of the Schmitt's flip-flop 50c and the input of stage 49d. As already explained in the foregoing a positive pulse is transmitted, when the Schmitt's flip-flop 50c is switched, in order to change the state of NOT-gate 65d from "1" to "0." Now this output can be changed to state "1" when changing down from top gear to third gear. In this case the AND-gate 66d having its other input in state "1" (because transistor 202c is blocked by the "0" state of the complementary output of the Schmitt's flip-flop 50c) will permit the transmission of a gear change-down pulse.

b. It will be assumed that the driver raises his foot not completely and then depresses again the accelerator pedal, for example when hesitating before overtaking (case illustrated in FIG. 14B). In this case it is desired to avoid a change from third to fourth gear, then from fourth gear to third gear.

During the time the driver releases somewhat the accelerator pedal the operation described in the above section (b) is repeated. When the increasing general control voltage U (FIG. 14B) attains the voltage threshold $U_{34}$ corresponding to the change from third to fourth gear, the Schmitt's flip-flop 50c is switched from state "0" to state "1" and simultaneously (as a consequence of the loop circuit) the output of NOT-gate 65d changes from state "1" to state "0." Thus, the change-down circuit 43 is prepared for switching from state "0" to state "1" and controlling the change from top gear to third gear.

If as assumed hereinabove the driver depresses again the accelerator pedal before the time period T (of, say, 2 seconds) necessary for triggering the monostable multivibrator 205c has elapsed, the general control voltage U decreases as a consequence of the increment in the value of the resistance of potentiometer or rheostat 10 inserted in series, and when this voltage, during its decrease, attains the voltage threshold $U_{43}$ (inferior to threshold $U_{34}$) whereat the change from top gear to third gear is to take place, the Schmitt's flip-flop 50d is triggered from state "1" to state "0" and therefore the output of AND-gate 65d, and also the first input of AND-gate 66d, change from state "0" to state "1." On the other hand, since the Schmitt's flip-flop 50c is still in state "1," its complementary output is at level 0, whereby the transistor 202c is blocked and its collector has a positive potential corresponding to state "1." As both inputs of AND-gate 66d are in the logic state "1," this gate is conductive and its output assumes the state "1." The NOT-gate 78d reverses this state "1" into a state "0" which is fed to AND-gate 47c in order to block same. Therefore, when the monostable multivibrator 205c resumes its inoperative position and its output changes to state "1" after the predetermined time period T has elapsed, the normal output of Schmitt's flip-flop 50c, then in state "0," causes the AND-gate 71c to be blocked, so that the order for changing to a higher gear cannot be transmitted.

Otherwise stated, when the driver releases the accelerator pedal but not completely, and then depresses this pedal again, after a time period of less than 2 seconds, for example, no automatic change of the gear ratio in the transmission mechanisms takes place and the previously engaged gear remains unchanged. The above explanation given in connection with the pair of gears third-top is also applicable to the pair of gears second-third.

c. Now let us assume that, while the third gear is engaged, the driver releases the accelerator pedal, without desiring to engage the fourth gear, but is desirous on the other hand to have the possibility of changing down completely to low or first gear (case illustrated in FIG. 14C).

Immediately as the driver has released the pedal and even before the accelerator pedal has completed its stroke, the Schmitt's flip-flop 50c is switched as in the preceding case from state "0" to state "1" when the general control voltage exceeds the voltage threshold $U_{34}$. At this time the gate 71c is not conductive due to the action exerted by the monostable multivibrator 205c and therefore no change-up pulse is transmitted.

When the accelerator pedal is fully raised the limit switch 204 is closed, thus grounding (or switching to state "0") the third input of each gate 47b and 47c. As a result, the Schmitt's flip-flop 50c is restored to state "0" as well as the input of AND-gate 71c connected thereto. The timing action exerted by the monostable multivibrator 205c is then inoperative. Under these conditions, the driver of the vehicle can choose two solutions: either reaccelerating after a certain timelag, or in contrast thereto decelerate until the vehicle is brought to a complete standstill.

1. Let us assume that after a certain time period, for example in excess of 2 seconds, i.e., period T, the driver reaccelerates (voltage curve U shown in thick lines in FIG. 14C).

As the Schmitt's flip-flop 50c is reset to state "0," the top gear can be engaged normally if permitted by driving, road or other conditions and also by the driver of course. The operation will then proceed in the manner described with reference to FIG. 2.

2. Assuming now that the driver wants to decelerate until the vehicle is brought to a complete standstill (voltage curve U shown in dash lines in FIG. 14C).

Since the limit switch 204 controlled by the accelerator pedal 11 is closed, the bases of transistors 202a, 202b and 202c are grounded and these transistors are blocked or nonconductive. Therefore, their collectors connected to the inputs of AND-gates 66f, 66e and 66d respectively will be at a positive potential (state "1"), and these gates will be released. Under these conditions, these gates can permit the passage of change-down orders.

It will be noted that at the outputs of gates 71d, 71e and 71f series-connected capacitors 206d, 206e and 206f, respectively, are provided, the function of these capacitors consisting of converting the changes in stable condition into pulses.

Figure 15:
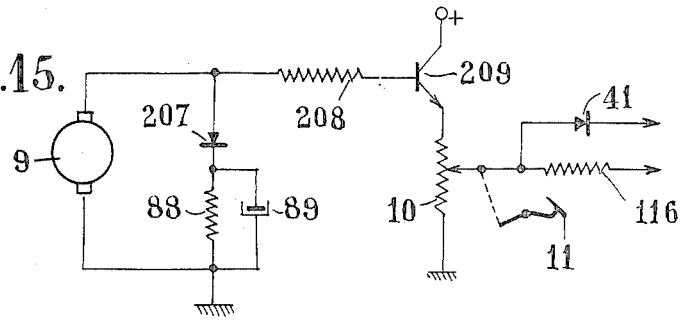
FIG. 15 is a fragmentary wiring diagram showing a modified form of embodiment of the control voltage generator.

The circuit illustrated in FIG. 15 shows a modified mounting of potentiometer 10 responsive to accelerator pedal 11.

A diode 207 in series with capacitor 89 and the parallel-connected resistor 88, is connected in parallel to the terminals of the tachometric generator 9. The negative terminal of this generator is grounded and its positive terminal is connected through a resistor 208 to the base of a NPN-type transistor 209 operating as main impedance adapter. The collector of this transistor 209 is connected to the + terminal of the power supply, and its emitter is connected to one end of the potentiometer 10 having its other end grounded. The sliding contact of potentiometer 10 is connected in parallel to resistor 116 and diode 41 of the circuit illustrated in FIG. 2.

This modified form of embodiment is advantageous in that it reduces considerably the resistance value of potentiometer 10, thus affording a reduction in cost while minimizing possible temperature drifts. Besides, the function of a diode 207 is to prevent a possible discharge of capacitor 89 into the measuring circuit.

According to another modified form of embodiment the potentiometers 48a to 48f provided in the circuit illustrated in FIG. 2 for adjusting the trigger thresholds of the various circuits for changing the transmission ratios up and down, may be shifted and mounted directly in the emitter-collector circuits of the transistors (such as transistor 54 illustrated in FIG. 5) of the impedance adapter stages 49a to 49f provided at the input of the various circuits for changing gear ratios up and down. The main advantage provided by this mounting is the same as that explained in the preceding paragraph.

Now reference will be made to FIG. 16 to describe a device adapted to permit the use of the engine for braking purposes and assisting the braking system proper.

Figure 16:
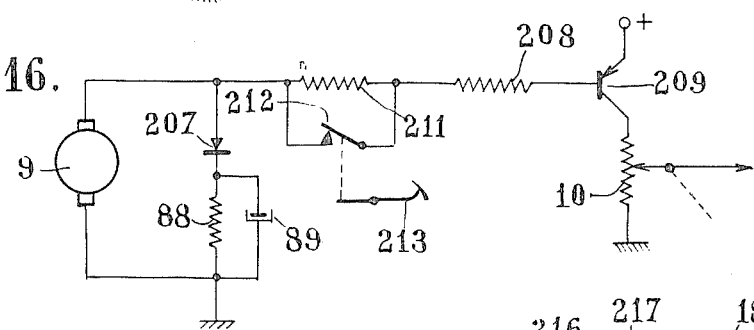
FIG. 16 is a wiring diagram of a circuit for using the braking force of the engine.

The circuit shown in FIG. 16 is similar to the circuit of FIG. 15 but comprises in addition a resistor 211 connected between the positive terminal of generator 9 and resistor 208, and contact 212 connected in parallel to resistor 211. Contact 212 is actuated either by the brake pedal 213 or by the pressure in the braking circuit so as to be opened only during brake applications. Under these conditions, when the driver depresses the brake pedal 213 the opening of contact 212 is attended by the insertion of resistor 211 in series with resistor 208, and thereafter by a reduction in the general control voltage U and therefore a shift down in the gear-change thresholds to cause a shift to lower gear ratio for increased engine braking.

Now reference will be made to FIG. 17 to describe a circuit adapted to produce the automatic resetting of the transmission mechanism to its neutral condition. With this device the driver is not compelled to change manually to neutral before starting the engine after the vehicle has been stopped for example with any speed engaged in the transmission mechanism during the manual operation of the control device, or when the first or low gear is engaged in the automatic operation.

Figure 17:
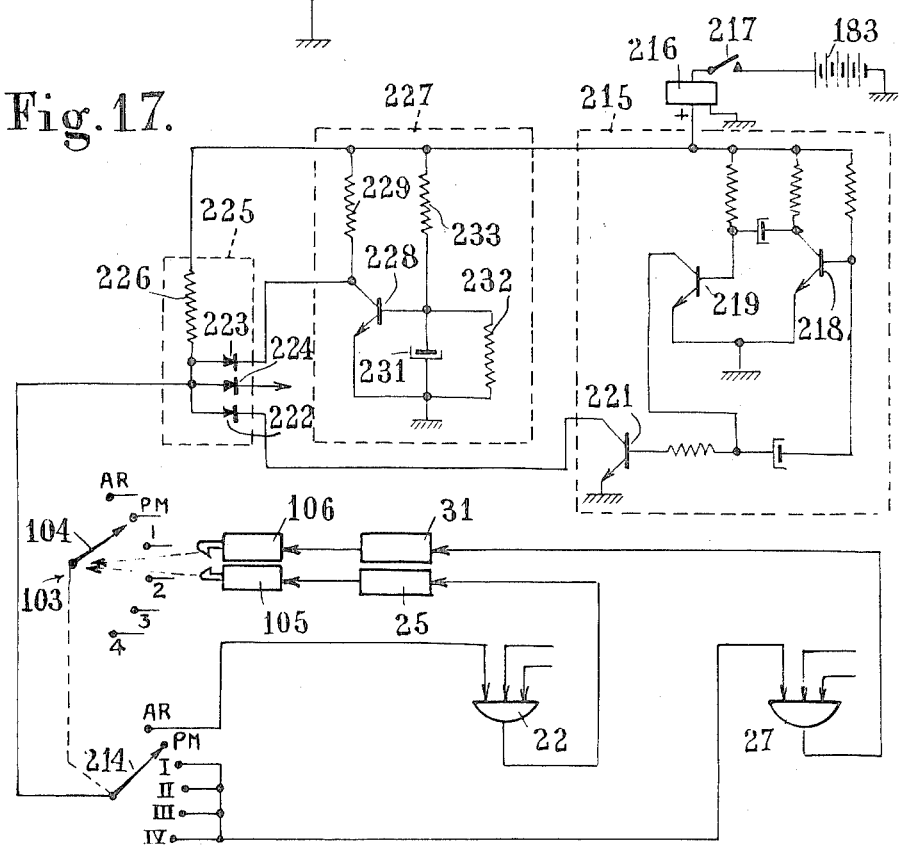
FIG. 17 is a wiring diagram of a circuit for automatically restoring the neutral condition of the transmission mechanism.

The device illustrated in FIG. 17 comprises a slide or rotary contact arm 214 coupled with the rotary arm 104 of rotary switch 103 incorporated in the recopying device. As already described in the foregoing, this rotary arm 104 and therefore the new rotary arm 214 are moved stepwise, in rigid coupling relationship with the distributor of the servo action device of the transmission mechanism, in the upward-change direction through the electromagnet 105 connected to the change-up pulse output stage 25, and in the downward change direction through the other electromagnet 106 connected to the change-down pulse output stage 31. These stages 25 and 31 are connected to the outputs of OR gates 22 and 27, respectively.

The movable contact arm 214 engages a contact stud AR (reverse) connected to one input of OR-gate 22, another contact stud PM (neutral) unconnected, and contact studs I, II, III and IV corresponding to the four speeds of the gearbox and connected in common to one input of OR-gate 27.

The circuit illustrated in FIG. 17 comprises on the other hand a monostable multivibrator denoted in general by the reference number 215 and connected to a source of stabilized DC 216 (for example a +10-volt source) supplied from the storage battery 183 of the vehicle through a contact 217 controlled by the ignition key controlling the general electric power supply circuit of the vehicle. The monostable multivibrator 215 comprises essentially two transistors 218 and 219 and a reversing and output amplifying transistor 221. The emitter of this NPN-type transistor is grounded and its collector is connected to the cathode of a diode 222 forming with another pair of parallel-connected diodes 223 and 224 an AND-gate 225. The anodes of these three diodes are connected in common on the one hand to the positive terminal through a resistor 226 and on the other hand to the movable contact arm 214 of rotary switch 103.

The cathode of diode 223 is connected to the output of a timing device 227 comprising an NPN-type transistor 228 having its emitter grounded and its collector connected on the one hand to the cathode of diode 223 and on the other hand to the positive terminal via a resistor 229. A capacitor 231 and a resistor 232 are connected in parallel between the base and the emitter of said transistor 228, and another resistor 233 connects this base to the positive terminal.

The diode 224 provides any desired inhibition contemplated at AND-gate 225; thus, for example, it may be connected to the output of level detector stage 94 of safety circuit 29 for reasons to be explained presently.

The above described circuit operates as follows: it will firstly be assumed that the vehicle has been started in forward drive by operating the manual control, at any gear ratio, for example in third, and is not stopped by the driver who turns the ignition key off. Some time afterwards, when the driver wishes to restart the vehicle, he closes the general contact and this causes contact 217 to be also closed. At this time, the multivibrator 215, timing device 227 and AND-gate 225 are energized. The monostable multivibrator 215 is so adjusted that it produces output pulses at a predetermined rate which are fed to the diode 222 of AND-gate 225. On the other hand, when contact 217 was closed, transistor 228 of the timing device 227 was not conductive due to the discharged state of capacitor 231. The corresponding input of AND-gate 226 connected to the collector of this transistor is at a positive potential and therefore released, and it will be assumed that the same applies to the other input connected to diode 224.

Under these conditions, the pulses emitted from the monostable multivibrator 215 can be transmitted through gate 225 to rotary contact arm 214. The pulses are subsequently directed through OR-gate 27 to the change-down pulse output state 31 so as to energize the electromagnet 106. This electromagnet 106 causes a one-step rotation, at each pulse emitted from the monostable multivibrator 215 of the servo action device controlling the change speed mechanism and also the rotary switch 103. This sequence of operation is continued until the rotary contact arms of switch 103 engage the PM contact studs (neutral) corresponding to the neutral position of the transmission mechanism.

The pulses produced by the monostable multivibrator 215 are transmitted through the AND-gate 225 only during the time period in which the input of this gate (which is connected to timing device 227) is released, i.e., during the timelag determined by circuit RC. When the capacitor 231 has been charged sufficiently the transistor 228 becomes conductive and its collector is grounded so as to block the AND-gate 225. Thereafter, the pulses emitted from the monostable multivibrator 215 can pass through this gate and therefore any risk of causing these pulses to interfere with the normal operation of the control device during the operation of the vehicle is definitely precluded.

The diode 224 constitutes one input of AND-gate 225 corresponding to a safety condition, for example the inhibition of any change from first or low gear to neutral when the vehicle is being driven (due to its connection with the output of the level detector stage 94).

If the vehicle is stopped while the reverse is engaged (with rotary arm 214 on the contact stud AR), the first pulse of the monostable multivibrator 215, which is transmitted through AND-gate 225 is transmitted through OR-gate 22 to upchange pulse output stage 25 in order to switch the servo action control device of the transmission mechanism ans also the rotary switch 103 to the neutral position PM.

I claim:

1. Electronic device for controlling an automotive vehicle having an accelerator pedal, an engine throttle valve, at least one clutch, and a transmission mechanism having a plurality of stepped gear-ratios adapted for selection in operational sequence to effect a gear change in accordance with information about the speed of the vehicle and the load of the engine of said vehicle, said device comprising servocontrol members for said transmission mechanism, electric relay means for actuating said servocontrol members, a generator of a general control voltage depending upon the speed and the position of the accelerator pedal of the vehicle, an apparatus for the automatic transmission of information signals, receiving at its input said general control voltage, and comprising a first group of $(n-1)$ circuits in parallel for changing up to a higher gear ratio and a second group of $(n-1)$ circuits in parallel for changing down to a lower gear ratio, $n$ designating the number of forward speed gear ratios of the transmission mechanisms, these various gear change-up and change-down circuits comprising respective level detector stages adapted to trigger from a first state to a second state, and to thereby produce automatic control pulses when the control voltage exceeds selected thresholds whereat the respective gear changes are to take place, and which are arranged in stepped relation to one another according to the various gear ratios, first and second output stages having respective inputs connected to the various level detector stages comprised in said gear change-up circuits and in the said gear change-down circuits, and outputs connected to the electric relay means of the said servocontrol members, for converting the automatic control pulses emitted by the level detector stages, during their changes of state, into signal of calibrated duration, and for applying said signals to said electric relay means, and a manual control pulse selector, adapted to be hand operated by the driver for transmitting manual control pulses to the respective inputs of said first and second output stages in parallel with the automatic control pulses delivered by the various gear change-up and change-down circuits.

2. Control device according to claim 1 which comprises servocontrol members for operating said clutch, an output stage for the gear change-up pulses, a gear change-up control relay connected to said output stage and adapted to actuate a contact, and means controlling said clutch operating servocontrol members for differentiating the timing of the clutch reengagement when changing up to a higher gear from the timing provided when changing down to a lower gear, said means being connected to said contact.

3. Control device according to claim 1, in which said general control voltage generator comprises a tachometric generator delivering a voltage proportional to the vehicle speed, and in which a circuit connected in parallel to the terminals of said generator comprises an insulation diode in series with a resistor and a capacitor connected in parallel, a transistor, a second resistor connecting one terminal of said generator to the base of said last-named transistor and a potentiometer connected in the emitter-collector circuit of said transistor, the slide of said potentiometer being brought to the general control voltage and responsive to the accelerator pedal of the vehicle for causing said voltage to vary as a function of the engine torque.

4. Control device according to claim 1, wherein the said manual control pulse selector comprises a hand lever adapted to be set in two different positions corresponding to the one to automatic driving conditions and the other the manual driving conditions, and second and third contacts actuated by said hand lever for transmitting in each one of the positions of said hand lever, manual control pulses respectively to said first and second output stages.

5. Control device according to claim 4, which comprises a first AND gate, of which a first input is connected to the outputs of the said gear change-up circuits, a first OR circuit having a first input connected to the output of said first AND gate, a second input connected to the said second contact of the manual control pulse selector, and one output connected to the input of the said first output stage, a second AND gate, of which a first input is connected to the outputs of the said gear change-down circuits, a second OR circuit having one input connected to the output of said second AND gate, a second input connected to the said third contact of the manual control pulse selector, and an output connected to the input of said second output stage, the said manual control pulse selector comprising a fourth contact, connected in common to second inputs, respectively, of said first and second AND gates, said fourth contact transmitting a potential adapted to block said first and second AND gates when the nand lever of said manual control pulse selector is in the manual driving position.

6. Control device according to claim 5, in which said first and second AND gates comprise each a third input connected to the output of the general control voltage generator in order to block said first and second AND gates when said general control voltage is not present.

7. Control device according to claim 5, comprising means for signalling the engaged gear ratio of the transmission mechanism, said means comprising essentially a signalling line for each forward speed provided by said transmission mechanism, and an auxiliary or neutral line, for signalling the disengaged or neutral position of the transmission mechanism, only one of said signalling lines being brought to a predetermined voltage when the corresponding gear ratio is actually engaged, a rotary switch comprising contact studs to which are connected the said neutral line and the lines associated with the various gear ratios, respectively, a first movable contact arm adapted to engage each contact stud separately, a device for storing the predetermined voltage applied to said first movable contact arm of said rotary switch, and wherein each one of said gear change-up circuits comprises an input AND gate having a first input connected to the output of said general control voltage generator, a level detector stage, having means to adjust its trigger threshold and one input connected to the output of the input AND gate, a two-input output AND gate having its first input connected to the output of said level detector stage and the other input connected to the signalling line associated with the higher gear ratio of the two gear ratios between which the gear change-up circuit concerned is adapted to produce a gear change, a first capacitor connected to the output of each one of said output AND gates, and a third OR circuit having its inputs connected to the first capacitors of the various gear change-up circuits respectively and its output connected to the first input of the first AND gate.

8. Control device according to claim 7, which comprises a shaping and timing stage inserted in each signalling line and having its output connected to the second input of the output AND gate of the associated gear change-up circuit.

9. Control device according to claim 7 in which the input AND gate of each gear change-up circuit comprises a second input connected to the gear change-down circuit corresponding to the same pair of gear ratios of the transmission mechanism, and a second capacitor connected between said second input of said input AND gate and ground.

10. Control device according to claim 7, which comprises, between the output of the level detector stage of a gear change-up circuit associated with a given pair of gear ratios of the transmission mechanism, on the one hand, and the input of the gear change-down circuit associated with the same pair of gear ratios on the other hand, a third capacitor and a first resistor in parallel, and a diode connected in series therewith with a polarity in opposition to that of the general control voltage.

11. Control device according to claim 7, wherein each gear change-down circuit comprises a level detector stage having means to adjust its trigger threshold, means for attenuating the general control voltage and applying said attenuated voltage to the input of the said level detector stage, a first NOT gate having its input connected to the output of said level detector stage, a checking AND gate having a first input connected to the output of said NOT gate and a second input connected to the output of the level detector stage of the gear change-up circuit corresponding to the same pair of gear ratios of the transmission mechanism, an output AND gate having a first input connected to the output of said checking AND gate, a second NOT gate having its input connected to the output of said checking AND gate and its output connected to the second input of said input AND gate of the gear change-up circuit associated with the same pair of gear ratios, and a fourth OR circuit having its inputs connected to the outputs of the output AND gates of the various gear change-down circuits, the output of said fourth OR circuit being connected to the first input of said second AND gate.

12. Control device according to claim 11, wherein each one of said gear change-up circuits comprises a level detector stage having a normal output and another complementary or reverse output, a timing monostable multivibrator having a predetermined trigger time and its input connected to the normal output of said level detector stage of said gear change-up circuit and the output connected to a third input of said output AND gate of said gear change-up circuit, a reversing transistor having its base connected to said complementary output of said level detector stage and the output electrode connected to the second input of said checking AND gate of said gear change-down circuit associated with the same pair of gear ratios of the transmission mechanism, said device further comprising a contact connected to a source of blocking potential and responsive to the accelerator pedal so as to be closed only in the fully released and raised position of said pedal, said contact being connected on the one hand to the bases of the reversing transistors of the various gear change-up circuits and on the other hand to the third inputs of said input AND gates of said last-named circuits.

13. Control device according to claim 11, wherein the output AND gate of said first gear change-down circuit associated with the gear change from second to first gear has two inputs connected the one to the output of the checking AND gate of said first change-down circuit, and the other to the said first signalling line for signalling the first gear position, the output AND gate of the second gear change-down circuit, associated with the change from third to second gear, having three inputs, of which the first one is connected to the output of said checking AND gate of said second gear change-down circuit and the second and third inputs are connected respectively, to said first and second signalling lines for signalling the first gear and second gear positions respectively, and the output AND gate of said third gear change-down circuit, associated with the change from fourth to third gear, has three inputs of which the first one is connected to the output of said checking AND gate of said third gear change-down circuit and the second and third inputs connected respectively to said second and third signalling lines for signalling the second and third gear positions respectively.

14. Control device according to claim 7, wherein the level detector stages of the various gear change-up and change-down circuits consist of Schmitt triggers, of which the voltage thresholds determining the triggering thereof in the change-up direction differ from the voltage thresholds for the change-down direction as a consequence of the hysterics effect inherent to said Schmitt triggers, said thresholds being so determined that the trigger voltage of a level detector stage of a gear change-down circuit associated with a given pair of gear ratios of the transmission mechanism, when said general control voltage decreases, is higher than the trigger voltage of a level detector stage of a gear change-up circuit associated with the same pair of gear ratios, when said general control voltage decreases, and that the trigger voltage of a level detector stage of a gear change-up circuit associated with a given gear ratios of said transmission mechanism, when said general control voltage increases, is lower than the trigger voltage of the level detector stage of a gear change-up circuit associated with the same pair of gear ratios, when said general control voltage increases.

15. Control device according to claim 7, which comprises a safety circuit for preventing changing down resulting in an excessive engaging speed, this safety circuit being inserted between the third contact of said manual control pulse selector and the second OR circuit, said safety circuit comprising means for detecting the level of a voltage proportional to the vehicle speed and a logic circuit consisting of AND gates having connected to their inputs on the one hand the output of said voltage level detector means and on the other hand the signalling lines corresponding to all nonengaged lower gear ratios, the third contact of said manual control pulse selector being further connected to one of the inputs of each one of said AND gates gates.

16. A control device according to claim 15, in which the general control voltage generator comprises a tachometric generator delivering a voltage proportional to the vehicle speed, and said safety circuit comprises first, second, third and fourth level detector stages associated with the changes: first to neutral and neutral to reverse, second to first, third to second and fourth to third, respectively, said level detectors having stepped trigger thresholds and their inputs connected in common to said tachometric generator, and five AND gates associated with the changes: fourth to third, third to second, second to first, first to neutral and neutral to reverse, respectively, all of said AND gates having an input connected in common to the third contact of said manual control pulse selector, the first to neutral AND gate and the neutral to reverse AND gate having each another input connected to the input of the first level detector stage, the first to neutral AND gate having three other inputs connected respectively to the signalling lines which correspond respectively to the second, third and fourth forward speeds provided by said transmission mechanism, the second to first AND gate having a second input connected to the output of the second level detector stage and two other inputs connected respectively to the neutral signalling line and to the signalling line which corresponds to the first forward speed, the third to second AND gate having an input connected to the output of the third level detector stage and three other inputs connected respectively to the neutral signalling line and to the signalling lines which correspond respectively to said first and second forward speeds, and the fourth to third AND gate having an input connected to the output of the fourth level detector stage and four other inputs connected respectively to the neutral signalling line and 40 the signalling lines which correspond respectively to said first, second and third forward speeds, a fifth OR circuit having its inputs connected to the outputs of the five AND gates and its output connected to one input of the second OR circuit.

17. Control device according to claim 7 which comprises a safety circuit for preventing changing down resulting in excessive engine speed, this safety circuit comprising means for detecting the rotation speed of the vehicle engine and a trigger device adapted, when said engine speed exceeds a predetermined threshold, to block the second AND gate to inhibit the passage of automatic control pulses.

18. Control device according to claim 5, comprising a safety circuit for preventing automatic gear changing when the general control voltage is zero, said safety circuit being connected between third inputs of said first and second AND gates on the one hand, and the output of said general control voltage generator on the other hand, and said safety circuit comprising an input transistor and an output transistor both mounted with a common emitter, and a timing capacitor connected between the collector of the output transistor and ground.

19. Electronic device for controlling an automotive vehicle having an accelerator pedal, an engine throttle valve, at least one clutch, and a transmission mechanism having plurality of stepped gear-ratios, adapted for selection in operational sequence to effect a gear change, in accordance with information about the speed of the vehicle and the load of the engine of said vehicle, said device comprising servocontrol members for said transmission mechanism, electric relay means for actuating said servocontrol members, a generator of a general control voltage depending upon the speed and the position of the accelerator pedal of the vehicle, an apparatus for the automatic treatment of information signals, receiving at its input said general control voltage, and comprising a first group of $n-1$ circuits in parallel for changing up to a higher gear ratio and a second group of $n-1$ circuits in parallel for changing down to a lower gear ratio, $n$ designating the number of forward speed gear ratios of the transmission mechanism, these various gear change-up and change-down circuits comprising respective level detector stages adapted to trigger from a first state to a second state, and to thereby produce automatic control pulses when the control voltage exceeds selected thresholds whereat the respective gear changes are to take place, and which are arranged in stepped relation to one another according to the various gear ratios, means for generating, when one of the $n$ gear ratios of the transmission mechanism is engaged, one of $n$ separate gear ratio indicating signals, corresponding respectively to said $n$ gear ratios, first and second output stages having respective inputs, and outputs connected to the electric relay means of the said servocontrol members, means for transmitting an automatic control pulse produced by the level detector stage of any one of said circuits for changing from a first to a second gear ratio, to the input of one of said first and second output stages, only when the gear ratio indicating signal corresponding to said second gear ratio is not generated, and a manual control pulse selector, adapted to be hand operated by the driver for transmitting manual control pulses to the respective inputs of said first and second output stages in parallel with the automatic control pulses delivered by the various gear change-up and change-down circuits.

20. Electronic device for controlling, an automotive vehicle having an accelerator pedal, an engine throttle valve, at least one clutch, and a transmission mechanism having a plurality of stepped gear-ratios, adapted for selection in operational sequence to effect a gear change, in accordance with information about the speed of the vehicle and the load of the engine of said vehicle, said device comprising servocontrol members for said transmission mechanism, electric relay means for actuating said servocontrol members, a generator of a general control voltage depending upon the speed and the position of the accelerator pedal of the vehicle, an apparatus for the automatic treatment of information signals, receiving at its input said general control voltage, and comprising a first group of $n-1$ circuits in parallel for changing up to a higher gear ratio and a second group of $n-1$ circuits in parallel for changing down to a lower gear ratio, $n$ designating the number of forward speed gear ratios of the transmission mechanism, these various gear change-up and change-down circuits comprising respective level detector stages adapted to trigger from a first stage to a second state, and to thereby produce automatic control pulses, when the control voltage exceeds selected thresholds whereat the respective gear changes are to take place, and which are arranged in stepped relation to one another according to the various gear ratios, first and second output stages having respective inputs connected to the various level detector stages comprised in the said gear change-up circuits and in the said gear change-down circuits, and outputs connected to the electric relay means of the said servocontrol members, for converting the automatic control pulses emitted by the level detector stages, during their changes of state, into signals of calibrated duration, and for applying said signals to said electric relay means, a manual control pulse selector, adapted to be hand operated by the driver for producing manual control pulses, means for sensing the rotation speed of the vehicle engine, means for generating an inhibit signal when the sensed rotation speed exceeds at least one predetermined threshold, and means for transmitting a manual control pulse produced by said selector to the input of one of said first and second output stages, only when said inhibit signal is not generated.

21. Electronic device for controlling an automotive vehicle having an accelerator pedal, and engine throttle valve, at least one clutch, and a transmission mechanism having a plurality of stepped gear-ratios adapted for selection in operational sequence to effect a gear change in accordance with information about the speed of the vehicle and the load of the engine of said vehicle, said device comprising servocontrol members for said transmission mechanism, electric relay means for actuating said servocontrol members, a generator of a general control voltage depending upon the speed and the position of the accelerator pedal of the vehicle, an apparatus for the automatic treatment of information signals, receiving at its input said general control voltage, and comprising a first group of $n-1$ circuits in parallel for changing up to a higher gear ratio and a second group of $-1$ circuits in parallel for changing down to a lower gear ratio, $n$ designating the number of forward speed gear ratios of the transmission mechanism, these various gear change-up and change-down circuits comprising respective level detector stages adapted to trigger from a first state to a second state, and to thereby produce automatic control pulses when the control voltage exceeds selected thresholds whereat the respective gear changes are to take place, and which are arranged in stepped relation to one another according to the various gear ratios, means for generating, when one of the $n$ gear ratios of the transmission mechanism is engaged, one of $n$ separate gear ratio indicating signals, corresponding respectively to said $n$ gear ratios, first and second output stages having respective inputs, and outputs connected to the electric relay means of the said servocontrol members, means for transmitting an automatic control pulse produced by the level detector stage of any one of said circuits for changing from a first to a second gear ratio to the input of one of said first and second output stages, only when the gear ratio indicating signal corresponding to said second gear ratio is not generated, a manual control pulse selector for producing manual control pulses, means for sensing the rotation speed of the vehicle engine, means for generating $n$ separate inhibit signals when the sensed rotation speed respectively exceeds $n$ predetermined thresholds, corresponding respectively to changing from one of the $n$ forward speed gear ratios down to the next lower gear ratio and means for transmitting a manual control pulse produced by said selector to the input of one of said first and second output stages, only when a gear ratio indicating signal, corresponding to one of said $n$ gear ratios is generated and the inhibit signal corresponding to changing from said one gear-ratio down to the next lower gear ratio is not generated.

* * * * *